(12) United States Patent
Kawamura et al.

(10) Patent No.: US 7,175,817 B2
(45) Date of Patent: Feb. 13, 2007

(54) COMPACT CHEMICAL REACTOR AND CHEMICAL REACTION SYSTEM

(75) Inventors: Yoshihiro Kawamura, Fussa (JP); Naotsugu Ogura, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 560 days.

(21) Appl. No.: 10/634,380

(22) Filed: Aug. 4, 2003

(65) Prior Publication Data
US 2004/0025784 A1 Feb. 12, 2004

(30) Foreign Application Priority Data
Aug. 7, 2002 (JP) ............................. 2002-229390

(51) Int. Cl.
*B01J 8/04* (2006.01)
*B01J 3/00* (2006.01)
*C10L 3/00* (2006.01)

(52) U.S. Cl. ..................... 422/190; 422/211; 48/127.7; 48/127.9; 48/198.1

(58) Field of Classification Search ................ 422/190, 422/211; 48/127.7, 127.9, 198.1; 429/19, 429/22, 17, 23
See application file for complete search history.

(56) References Cited

U.S. PATENT DOCUMENTS

| | | | |
|---|---|---|---|
| 5,716,842 A | 2/1998 | Baier et al. | |
| 6,200,536 B1* | 3/2001 | Tonkovich et al. | 422/177 |
| 6,428,758 B1* | 8/2002 | Schuessler et al. | 422/239 |
| 6,447,736 B1* | 9/2002 | Autenrieth et al. | 422/190 |
| 6,638,654 B2 | 10/2003 | Jankowksi et al. | |
| 6,786,716 B1* | 9/2004 | Gardner et al. | 431/268 |
| 6,824,905 B2 | 11/2004 | Shioya et al. | |
| 6,916,565 B2 | 7/2005 | Shioya | |
| 2002/0094462 A1* | 7/2002 | Shioya et al. | 429/19 |
| 2003/0039874 A1 | 2/2003 | Jankowski et al. | |
| 2003/0103878 A1 | 6/2003 | Morse et al. | |
| 2003/0138685 A1* | 7/2003 | Jankowski et al. | 429/30 |
| 2004/0018129 A1 | 1/2004 | Kawamura et al. | |
| 2004/0043273 A1 | 3/2004 | Jankowski et al. | |
| 2004/0048128 A1 | 3/2004 | Jankowski et al. | |
| 2004/0148858 A1 | 8/2004 | Yamamoto et al. | |
| 2004/0148859 A1 | 8/2004 | Kawamura et al. | |

FOREIGN PATENT DOCUMENTS

| | | |
|---|---|---|
| DE | 199 20 786 A1 | 11/2000 |
| DE | 100 10 400 A1 | 9/2001 |
| EP | 1 022 059 A2 | 7/2000 |

(Continued)

OTHER PUBLICATIONS

Derwent Abstract Accession No. 2003-407946/39. JP 2003-045459 A (Casio Computer Co. LTD), Feb. 14, 2003.
Derwent Abstract Accession No. 2003-581544/55, Class JP 2003-168685 A (Casio Computer Co. LTD), Jun. 13, 2003.

(Continued)

*Primary Examiner*—N. Bhat
(74) *Attorney, Agent, or Firm*—Frishauf, Holtz, Goodman & Chick, P.C.

(57) ABSTRACT

The compact chemical reactor includes a first substrate, a second substrate attached to the first substrate. A micro flow path is defined between the first substrate and the second substrate. A thin film heater provided in the flow path.

39 Claims, 23 Drawing Sheets

FOREIGN PATENT DOCUMENTS

| | | |
|---|---|---|
| JP | 2-172538 A | 7/1990 |
| JP | 6-233918 A | 8/1994 |
| JP | 2000-506432 A | 5/2000 |
| JP | 2002-18271 A | 1/2002 |
| WO | WO 00/45457 A1 | 8/2000 |
| WO | WO 02/24322 A2 | 3/2002 |
| WO | WO 03/082460 A1 | 10/2003 |
| WO | WO 2004/030805 A1 | 4/2004 |

OTHER PUBLICATIONS

Poser, S. et al. "Chip elements for fast thermocycling" Sensors and Actuators A, Elsevier Sequoia S.A., Lausanne, CH, vol. 62, No. 1-3, Jul. 1, 1997, pp. 672-675, XP004119707, ISSN: 0924-4247.

Srinivasan R. et al., "Micromachined Reactors For Catalytic partial Oxidation Reactions" Aiche Jornal, New York, NY US, vol. 43, No. 11, Nov. 1997, pp. 3059-3069, XP000669285, ISSN: 0001-1541.

* cited by examiner

US 7,175,817 B2

COMPACT CHEMICAL REACTOR AND CHEMICAL REACTION SYSTEM

CROSS-REFERENCE TO RELATED APPLICATIONS

This application is based upon and claims the benefit of priority from the prior Japanese Patent Application No. 2002-229390, filed Aug. 7, 2002, the entire contents of which are incorporated herein by reference.

BACKGROUND OF THE INVENTION

1. Field of the Invention

This invention relates to a compact chemical reactor and a chemical reaction system.

2. Description of the Related Art

In a technical field of chemical reactions, a chemical reactor has been known which produces a desired fluid material by a chemical reaction (catalytic reaction) of a fluidized mixture in the presence of a catalyst provided in a flow path. Some of such chemical reactors have a micro flow path formed in a substrate of silicon or the like by use of a micro fabrication technique accumulated by a semiconductor production technique of semiconductor integrated circuits or the like.

FIG. 22 is a transmitted plan view of one example of such a compact chemical reactor, and FIG. 23 is a sectional view along the line XXIII—XXIII of FIG. 22. This compact chemical reactor comprises a compact substrate 1. A flow path 2 made up of a micro meandering groove is formed in one surface of the substrate 1. A catalyst layer 3 is provided on an internal wall surface of the groove.

An opposite substrate 4 is joined onto the one surface of the substrate 1. An inflow port 5 and an outflow port 6 penetrating in a thickness direction of the opposite substrate 4 are formed at two predetermined positions of the opposite substrate 4 corresponding to both ends of the flow path 2. A heater 7 which meanders correspondingly to the flow path 2 is provided on the opposite surface of the substrate 1. The heater 7 supplies predetermined heat energy to the catalyst layer 3 in the flow path 2 for a chemical reaction, when predetermined heat is needed for the chemical reaction (catalytic reaction) in the compact chemical reactor.

In the conventional compact chemical reactor described above, the heater 7 is provided on a side of the opposite surface of the substrate 1 in operation. The heat of the heater 7 propagates to part in the substrate 1 where the flow path 2 is not provided before sufficiently propagating into the flow path 2, thus posing problems of a great deal of heat energy loss, inefficiency of energy use, and time taken for a desired chemical reaction to be caused.

An advantage of this invention is to provide a compact chemical reactor and a chemical reaction system capable of reducing a loss of heat energy of the heater, enhancing the efficiency of energy use, and rapidly promoting a reaction.

BRIEF SUMMARY OF THE INVENTION

A compact chemical reactor of the present invention comprising:
 a first substrate;
 a second substrate cohering to the first substrate;
 a micro flow path defined by the first substrate and the second substrate; and
 a thin film heater provided in the flow path.

Since the thin film heater is provided in the flow path, heat energy can be directly supplied into the flow path, and diffusion of the heat energy generated in the flow path can be reduced by both the substrates to significantly decrease heat released around it, thereby making it possible to significantly decrease a loss of heat energy from the thin film heater so as to enhance the efficiency of energy use. In this way, temperature in the compact chemical reactor can be rapidly controlled owing to the small energy loss, and a chemical reaction can be easily promoted.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
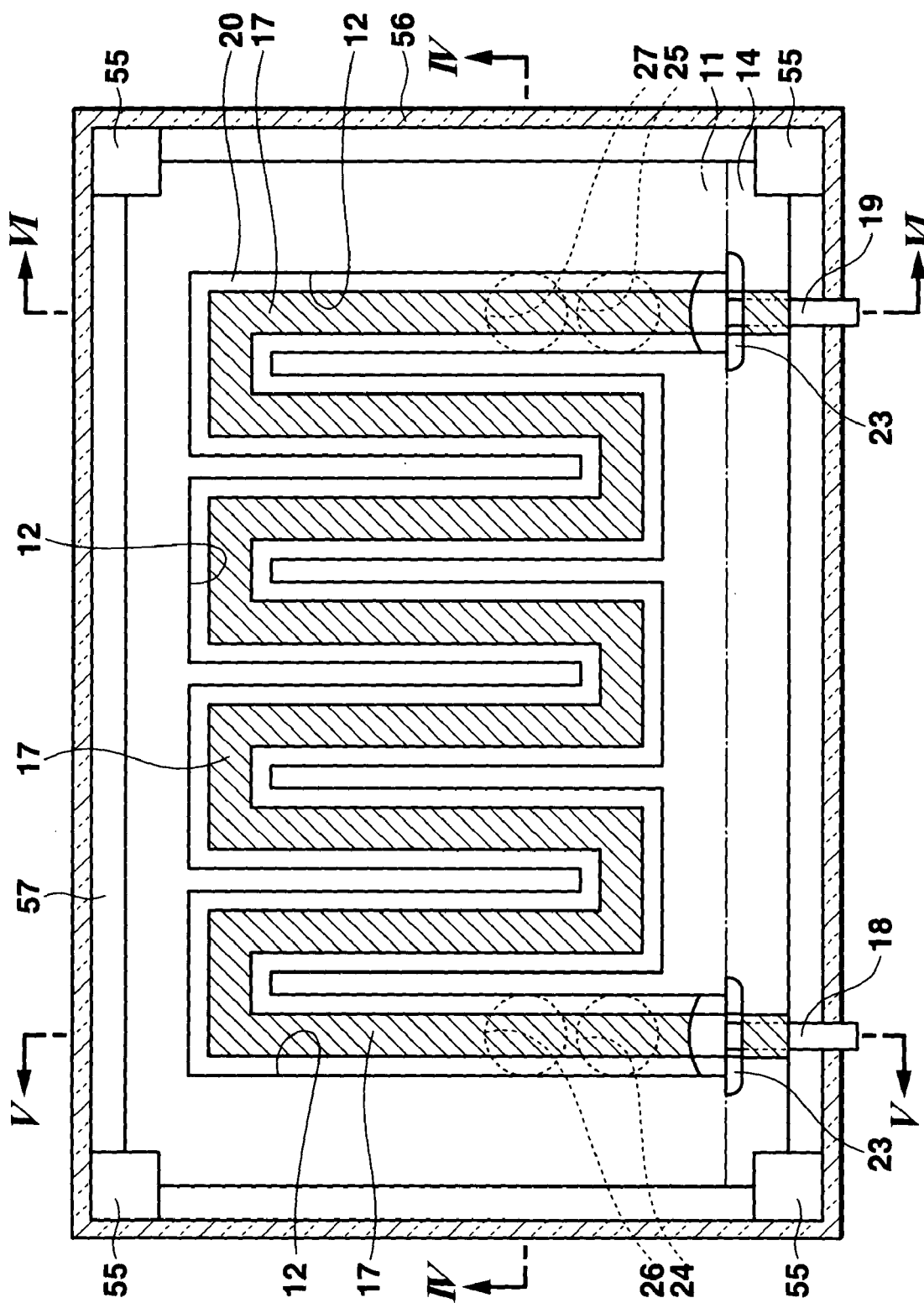
FIG. 1 is a schematic transmitted plan view showing a relative position of a thin film heater of a compact chemical reactor as a first embodiment of the present invention.
Figure 2:
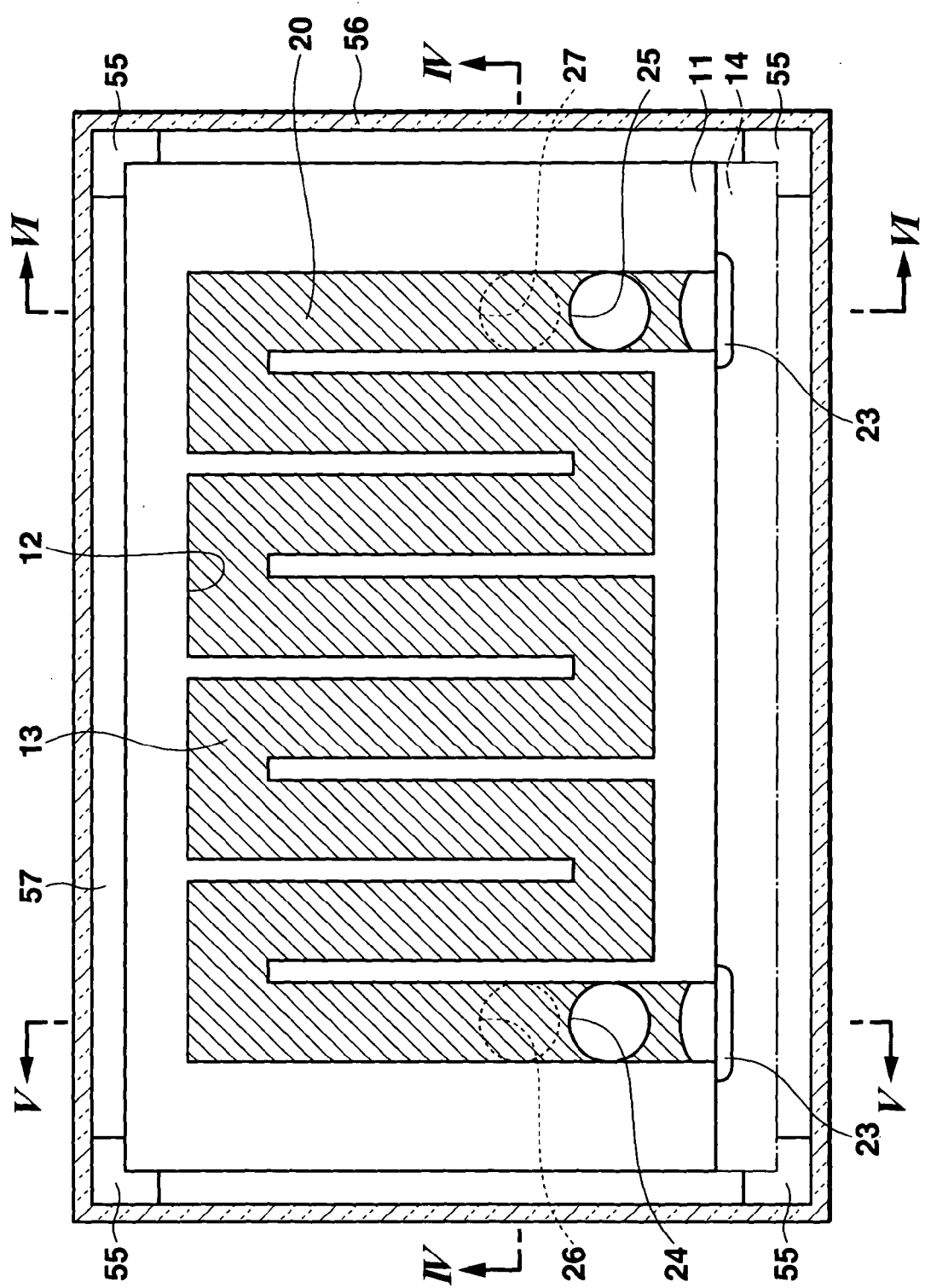
FIG. 2 is a schematic transmitted plan view showing a relative position of a catalyst layer which promotes a chemical reaction caused by the compact chemical reactor as the first embodiment of the present invention.
Figure 3:
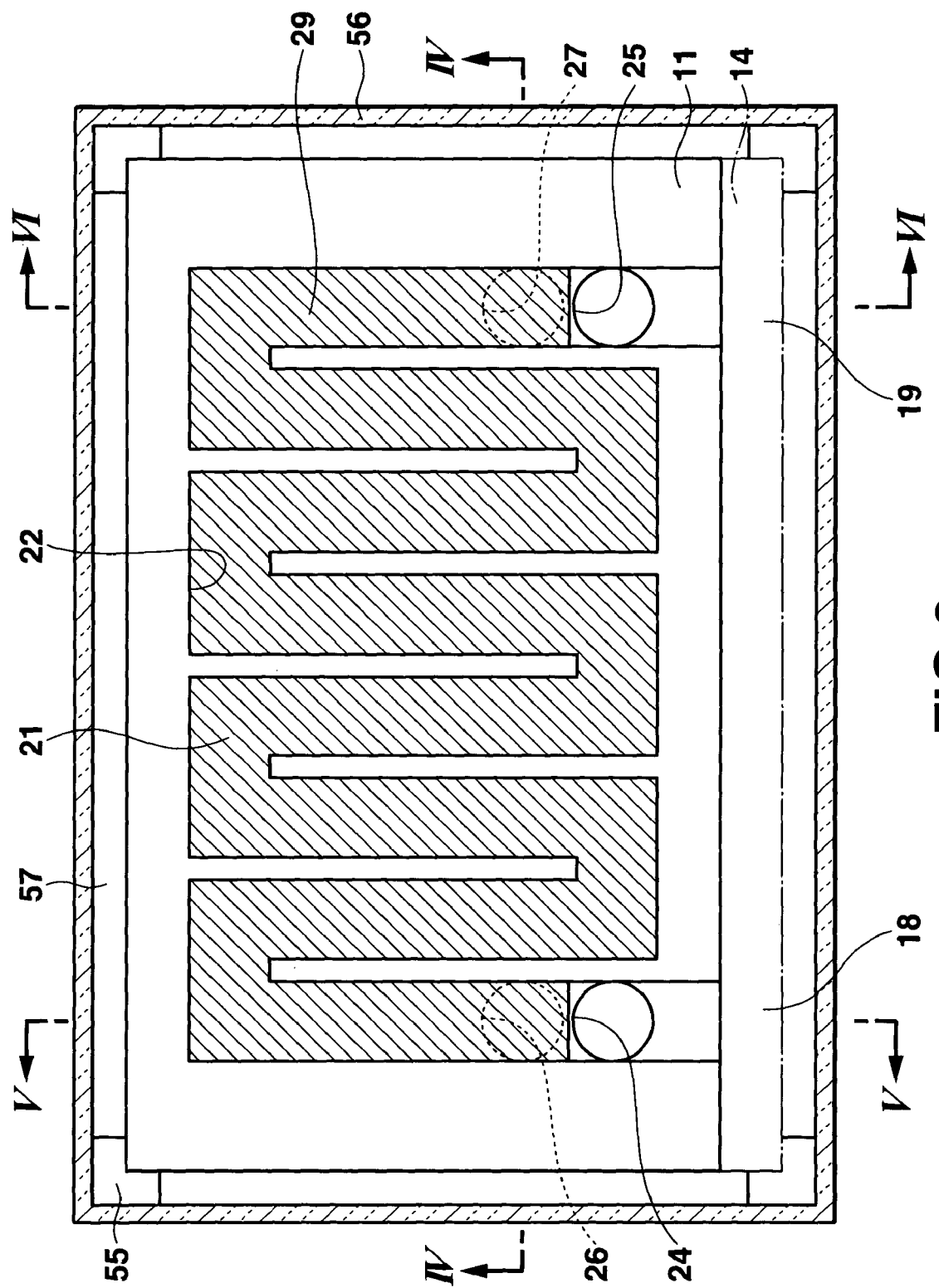
FIG. 3 is a schematic transmitted plan view showing a relative position of the catalyst layer which promotes a combustion reaction caused by a combustion section to heat the compact chemical reactor as the first embodiment of the present invention.
Figure 4:
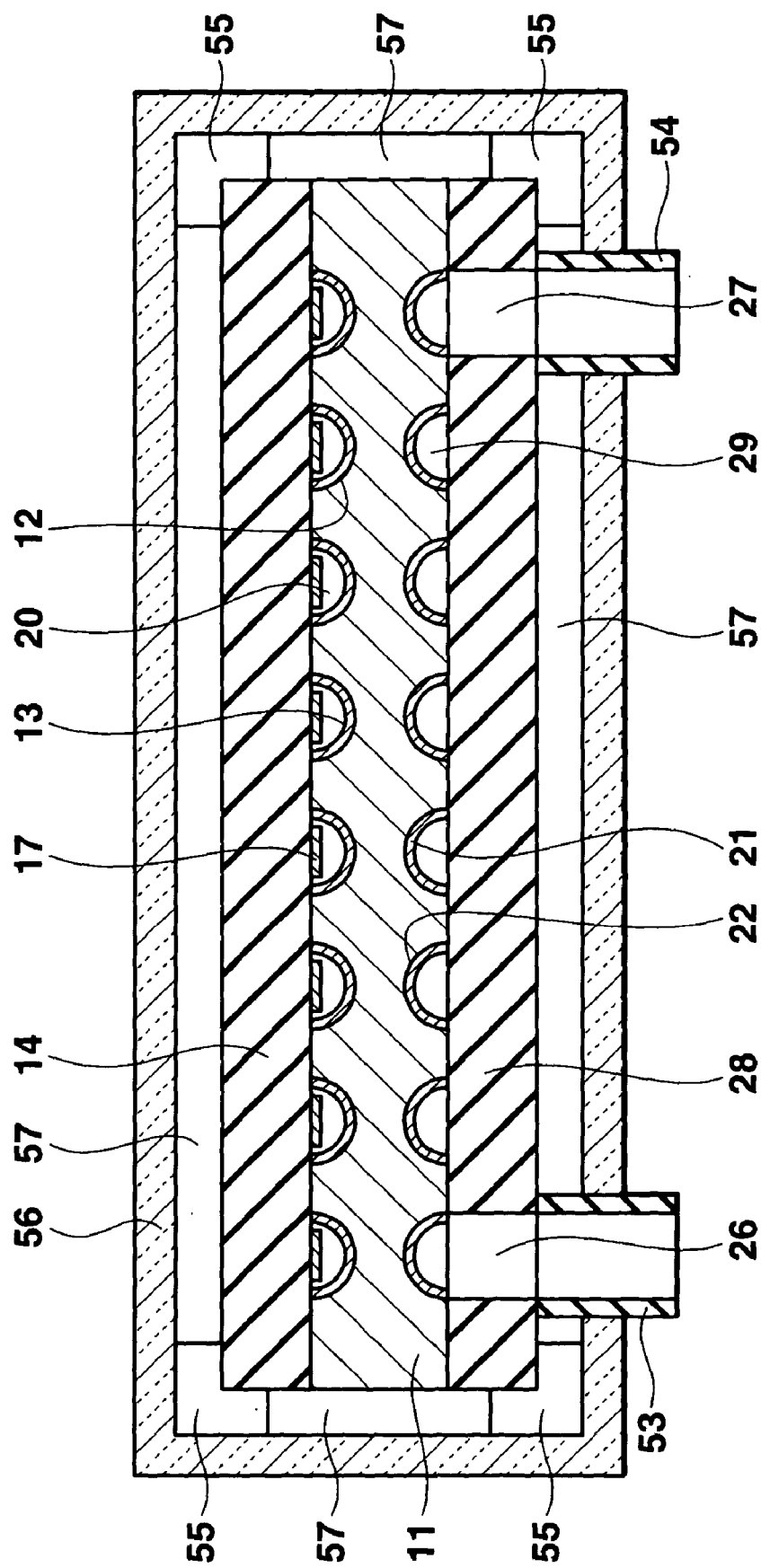
FIG. 4 is a sectional view along the line IV—IV of FIG. 1 to FIG. 3.
Figure 5:
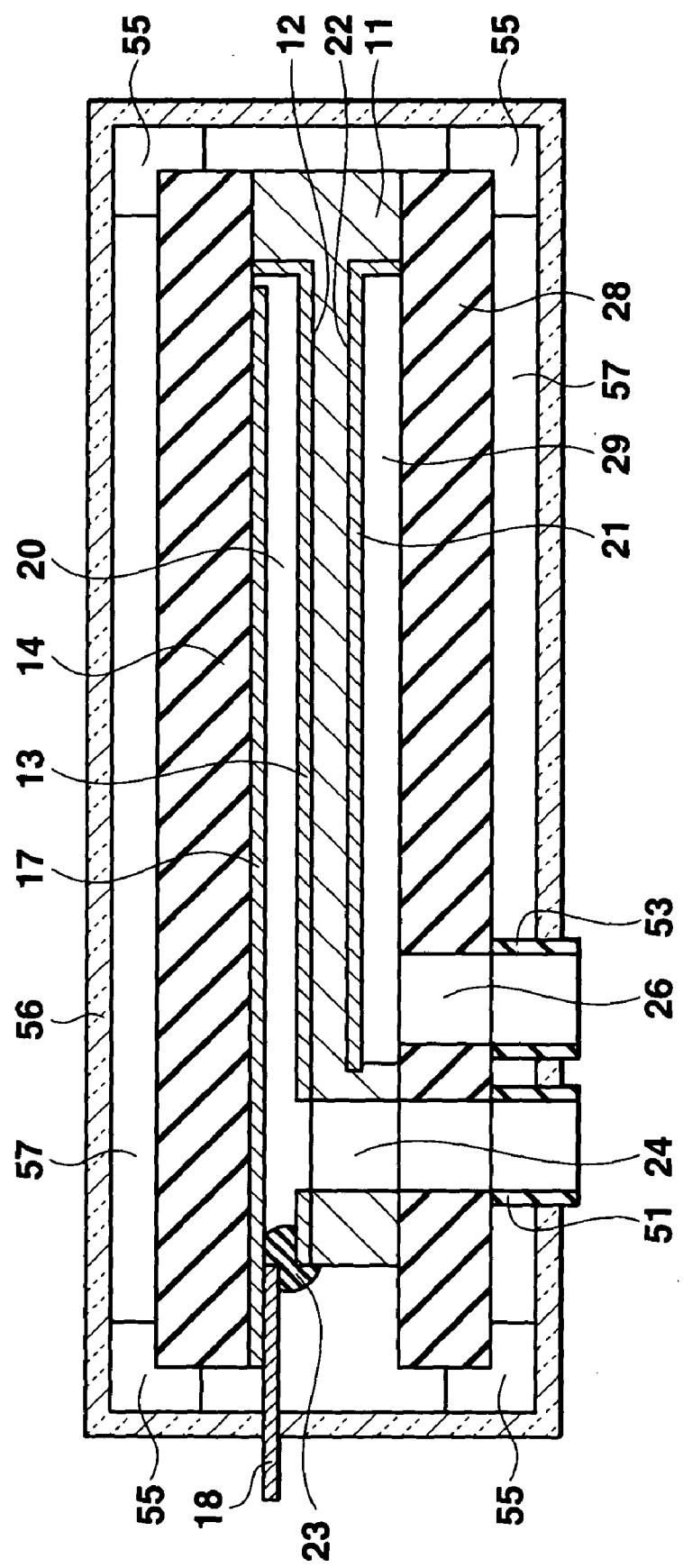
FIG. 5 is a sectional view along the line V—V of FIG. 1 to FIG. 3.
Figure 6:
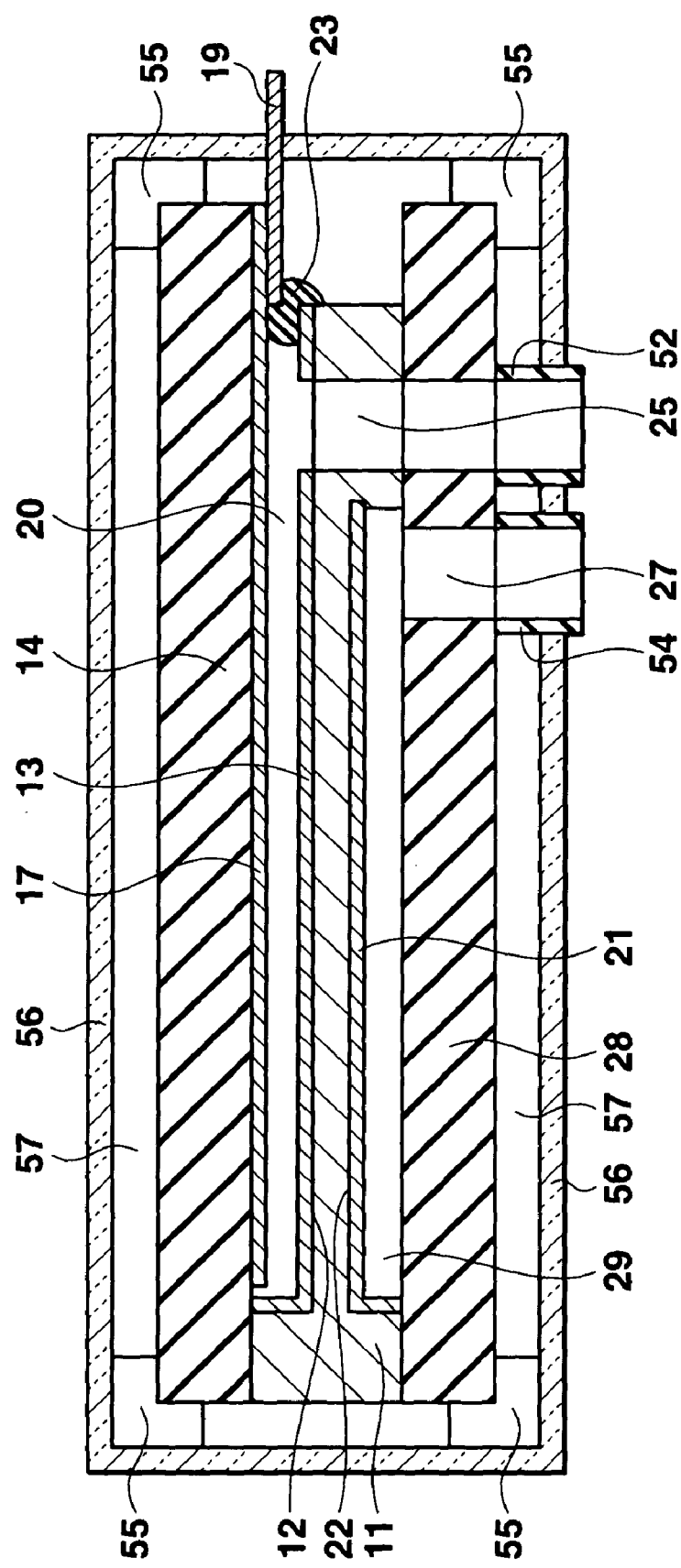
FIG. 6 is a sectional view along the line VI—VI of FIG. 1 to FIG. 3.

FIG. 1 is a schematic transmitted plan view showing a relative position of a thin film heater of a compact chemical reactor as a first embodiment of the present invention, FIG. 2 is a schematic transmitted plan view showing a relative position of a catalyst layer which promotes a chemical reaction caused by the compact chemical reactor, and FIG. 3 is a schematic transmitted plan view showing a relative position of the catalyst layer which promotes a combustion reaction caused by a combustion section to heat the compact chemical reactor. Furthermore, FIG. 4 is a sectional view along the line IV—IV of FIG. 1 to FIG. 3, FIG. 5 is a sectional view along the line V—V of FIG. 1 to FIG. 3, and FIG. 6 is a sectional view along the line VI—VI of FIG. 1 to FIG. 3. This compact chemical reactor comprises a first substrate 11 formed of a material having a high thermal conductivity such as silicon. In terms of sizes, the first substrate 11 has a length of about 15 to 35 mm, a width of about 10 to 25 mm, and a thickness of about 0.4 to 1.0 mm, as an example.

In a first surface of the first substrate 11, a meandering micro groove 12 is formed by use of a micro fabrication technique accumulated by a semiconductor production technique. The groove 12 has an arch-shaped section perpendicular to a flowing direction, and both ends extending to predetermined two positions on an end face of one side of the first substrate 11. In terms of sizes, the groove 12 has a width of about 0.2 to 0.8 mm, a maximum depth of about 0.2 to 0.6 mm and an entire length of about 30 to 1000 mm, as an example. A reaction catalyst layer 13 is provided on an inner wall surface of the groove 12. The reaction catalyst layer 13 may be made of a catalyst material itself, and may also be one in which a catalyst material is supported on a porous layer of aluminum oxide or the like.

The first substrate 11 is anode-joined on the first surface to a second substrate 14 made of a material such as glass having a thermal conductivity lower than that of the first substrate 11, and a space enclosed by the groove 12 of the first substrate 11 and covered with the second substrate 14 is a micro flow path 20 through which a fluid flows. The length of the second substrate 14 is the same as that of the first substrate 11, but the width of the second substrate 14 is slightly larger than that of the first substrate 11. In a state where the first substrate 11 and the second substrate 14 are anode-joined, one long side portion of the second substrate 14 protrudes from the first substrate 11. On the protruding long side of the second substrate 14, both ends of the groove 12 extend to a side end face of the first substrate 11 where they are open. Both the open ends are sealed with a sealant 23 made of glass, epoxy-based resin, or the like.

A meandering thin film heater 17 formed of a resistive element thin film such as TaSiOx or TaSiOxN is provided at a position corresponding to the groove 12 on a surface of the second substrate 14 opposite to the first substrate 11. The thin film heater 17 has a width a little smaller than that of the groove 12, and is disposed in the groove 12. When a chemical reaction (catalytic reaction) in the compact chemical reactor involves an endothermic reaction based on predetermined heat conditions, for example, the thin film heater 17 supplies predetermined heat energy to the reaction catalyst layer 13 in the groove 12 during the chemical reaction.

Both ends of the thin film heater 17 extend to predetermined two positions on the end face of the protruding long side of the second substrate 14. Wires 18, 19 each having a three-layer structure made of an Au layer, which is sandwiched between Ti—W layers, are provided on both the extending portions of the thin film heater 17. A voltage is applied to these wires 18, 19 to heat the thin film heater 17.

A groove 22, which is provided along the groove 12 provided in the first surface, is formed in a second surface of the first substrate 11. A combustion catalyst layer 21 is provided on an inner wall surface of the groove 22. The combustion catalyst layer 21 may be made of a catalyst material itself, and may also be one in which a catalyst material is supported on a porous layer of aluminum oxide or the like. The first substrate 11 is anode-joined on its second surface to a third substrate 28 so that the groove 22 is covered. A space formed by the third substrate 28 and the groove 22 of the first substrate 11 is a flow path 29 through which a fluid flows. The combustion catalyst layer 21 functions to promote a combustion reaction of the fluid flowing through the flow path 29. Heat by the combustion reaction in the combustion section which is constituted by the flow path 29 and the combustion catalyst layer 21 propagates to the reaction catalyst layer 13 on the surface of the groove 12 and to the flow path 20 via the first substrate 11, and promotes a predetermined chemical reaction caused by the material in the fluid flowing through the flow path 20. In other words, the fluid flowing through the flow path 20 and the reaction catalyst layer 13 are heated by the heat of the thin film heater 17 and the heat due to the combustion reaction in the flow path 29. Their temperature is controlled by an amount of fuel flowing through the flow path 29 and the voltage applied to the thin film heater 17. Therefore, the flow path 20 and the flow path 29 are desirably arranged vertically to each other so that at least part of them overlaps. It is desirable that the compact chemical reactor should be provided with a temperature sensor which detects the temperature in the flow path 20, and a circuit section 151 described later should properly apply a controlled voltage to the wires 18, 19 on the basis of temperature information of the temperature sensor to control the thin film heater 17 at a predetermined temperature.

A reaction system fluid inflow port 24 and a reaction system fluid outflow port 25 each penetrating from the first surface to the second surface of the first substrate 11 are formed in the vicinity of both ends of the flow path 20. The third substrate 28 has through holes corresponding to and communicating with the reaction system fluid inflow port 24 and the reaction system fluid outflow port, respectively 25. An inflow pipe 51 communicating with the reaction system fluid inflow port 24 via the through hole and an outflow pipe 52 communicating with the reaction system fluid outflow port 25 via the through hole are respectively attached on a surface of the third substrate 28 opposite to the first substrate 11. As a result, a fluid flows into the flow path 20 from the inflow pipe 51 via the reaction system fluid inflow port 24, and the fluid flows out from the outflow pipe 52 via the reaction system fluid outflow port 25.

A combustion system fluid inflow port 26 and a combustion system fluid outflow port 27 each penetrating the third substrate 28 are formed in the vicinity of both ends of the flow path 29. An inflow pipe 53 communicating with the combustion system fluid inflow port 26 and an outflow pipe 54 communicating with the combustion system fluid outflow port 27 are attached to the surface of the third substrate 28 opposite to the first substrate 11. Thus, such a configuration is provided wherein a fluid flows into the flow path 29 from the inflow pipe 53 via the combustion system fluid inflow port 26, and the fluid flows out from the outflow pipe 54 via the combustion system fluid outflow port 27.

In this compact chemical reactor, corner portions of the third substrate 28 are supported by insulating supports 55 made of a heat-insulating material, and corner portions of the second substrate 14 are supported by the insulating supports 55. A box-shaped heat-insulating wall 56 made of an insulating material is formed around a periphery of the insulating supports 55 so as to cover the entire compact chemical reactor. The heat-insulating wall 56 has openings through which the wires 18, 19, the inflow pipe 51, the outflow pipe 52, the inflow pipe 53 and the outflow pipe 54 extend to the external of the heat-insulating wall 56. Around a periphery of the compact chemical reactor, that is, in a space 57 between the insulation wall 56 and the compact chemical reactor, pressure is made lower than atmospheric pressure or an inactive gas is charged. In this way, the heat generated by the thin film heater 17 and the heat from the combustion of the fluid due to a catalytic action of the combustion catalyst layer 21 do not leak or hardly leak to the outside of the heat-insulating wall 56.

In this compact chemical reactor, since the thin film heater 17 is provided in the first micro flow path 20 provided between the first substrate 11 and the second substrate 14 that are anode-joined to each other, it is possible to directly supply heat energy to the reaction catalyst layer 13 in the flow path 20. In this way, a loss of heat energy from the thin film heater 17 can be significantly decreased so as to enhance the efficiency of energy use.

The combustion catalyst layer 21 and the combustion section of the second flow path 29 excellently heat the first flow path 20 and thus the reaction catalyst layer 13 to a high temperature, but it takes time to cause a combustion reaction and it also takes time to propagate heat to the first flow path 20 and the reaction catalyst layer 13 because the heat passes through the first substrate 11. On the contrary, the thin film heater 17 is a resistive element thin film, so that it can rapidly heat in response to an applied voltage, and moreover the thin film heater 17 is directly provided in the flow path 20, so that it can rapidly promote a chemical reaction in the flow path 20. Further, while it is relatively difficult to control temperature by the heat of a combustion reaction in the combustion section, it is easy to control a heating temperature of the thin film heater 17 by controlling a voltage to be applied, so that combustion heat in the flow path 29 can be used as auxiliary heat to adjust the flow path 20 and the reaction catalyst layer 13 to a predetermined temperature for a predetermined period of time.

Figure 7:
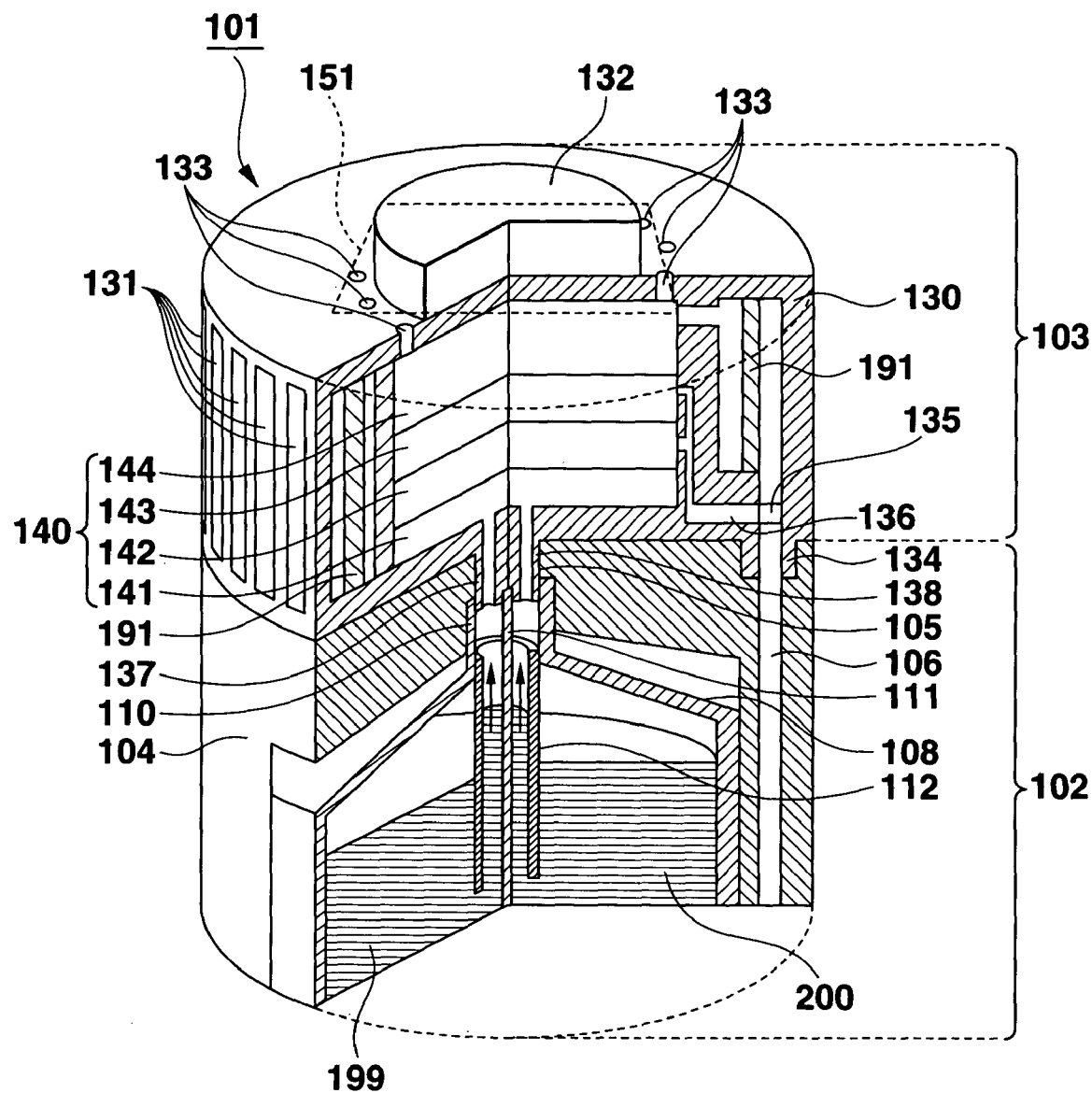
FIG. 7 is a schematic perspective view of a partially broken power generation system in which the compact chemical reactor of the present invention is applied to a reformer system.

FIG. 7 is a perspective view of a partially broken power generation system 101 comprising the compact chemical reactor of the present invention and a fuel cell.

As shown in FIG. 7, the power generation system 101 comprises a fuel storage module 102 which stores a fuel 199 to be reformed and a fuel 200 to be burnt; and a power generation module 103 which has a built-in compact reformer system 140 and generates electricity, using the fuel 199 stored in the fuel storage module 102. The compact reformer system 140 comprises a fuel vaporization section 141, a reforming reaction section 142, an aqueous shift reaction section 143 and a selective oxidative reaction section 144. The reforming reaction section 142, the aqueous shift reaction section 143 and the selective oxidative reaction section 144 each have a configuration of the compact chemical reactor shown in FIGS. 1 to 6. The fuel vaporization section 141 has a configuration of the compact chemical reactor shown in FIGS. 1 to 6 except that the thin film heater 17 is not provided.

In other words, all sections 141, 142, 143 and 144 have combustion sections 141A, 142A, 143A, 144A (FIG. 8), respectively that are constituted by the flow path 29 between the groove 22 of the first substrate 11 and the third substrate 28, the combustion catalyst layer 21, the inflow pipe 53 and the outflow pipe 52.

The fuel storage module 102 has a substantially cylindrical case 104, which can be detachably attached to the power generation module 103. A round through-hole 105 is formed in a head top portion of the case 104, and a first drain pipe 106 which allows by-product water produced by the power generation module 103 to flow is formed on an outer peripheral side of the case 104. A by-product collecting section 109 which stores water to be drained is disposed at a bottom of the fuel storage module 102. The by-product collecting section 109 is connected to the first drain pipe 106.

A fuel package 108 is housed inside the case 104, and part of an outer peripheral surface of the fuel package 108 is exposed outside the case 104. The fuel package 108 has a reformed fuel section 108A in which the fuel 199 is sealed and a combustion fuel section 108B in which a fuel 200 is sealed. The fuel package 108 is a transparent or semitransparent columnar member having an internal space, and is constituted of a biodegradable material degraded by bacteria or the like. As part of the fuel package 108 is outwardly exposed and the fuel package 108 is transparent or semitransparent, it is possible to easily check the presence and remaining amount of the fuel 199 and the fuel 200 inside through the fuel package 108.

The fuel 199 may be a mixture of a liquid chemical fuel and water, and alcohols such as methanol and ethanol or carbon compounds containing a hydrogen element, for example, ethers such as diethyl ether and gasoline are applicable as the chemical fuel. In the present embodiment, a mixture in which methanol and water are uniformly mixed at an equal mol is used as the fuel 199.

The fuel 200 may be a liquid chemical fuel, and alcohols such as methanol and ethanol or carbon compounds containing a hydrogen element, for example, ethers such as diethyl ether and gasoline are applicable as the chemical fuel. In the present embodiment, methanol is used as the fuel 200.

A partition plate 111 which separates the fuel 199 from the fuel 200 is formed inside the fuel package 108. A supply port 110 for supplying the fuel 199 and the fuel 200 to the power generation module 103 is provided at the head top portion of the fuel package 108 in a manner to protrude to be inserted into the through-hole 105 of the case 104.

A supply pipe 112 extending in upward and downward directions to be inserted in the supply port 110 in FIG. 7 is provided inside the fuel package 108. The supply pipe 112 extends from the bottom of the fuel package 108 to an edge of the supply port 110. Since the supply pipe 112 is divided by the partition plate 111, the fuel 199 between the supply pipe 112 and the partition plate 111 moves upward by a capillary phenomenon, and the fuel 200 between the supply pipe 112 and the partition plate 111 moves upward by the capillary phenomenon, but they do not mix with each other.

A sealing film is provided inside the supply port 110, which closes the entire supply port 110 so that the fuel 199 and the fuel 200 do not leak in a state where an intake nipple portion 137 and an intake nipple portion 138 of the power generation module 103 are not inserted, but the intake nipple portion 137 and the intake nipple portion 138 of the power generation module 103 are inserted into the supply port 110 in order to break the sealing film, and the intake nipple portion 137 and the intake nipple portion 138 communicate with the fuel package 108 so that they can take in the fuel 199 and the fuel 200, respectively.

The power generation module 103 comprises a substantially cylindrical case 130; the compact reformer system 140 disposed inside the case 130; a fuel cell section 191 disposed on a periphery of the compact reformer system 140 and on an outer peripheral side of the case 130; a by-product take-in section 135 which takes in part of the by-product produced by the fuel cell section 191 and supplies this to the compact reformer system 140 as necessary; and the circuit section 151 which electrically controls those above.

A plurality of slits 131 for supplying oxygen in the air outside the power generation module 103 that is needed for power generation by the fuel cell section 191 to the fuel cell section 191 are formed in a state arranged in parallel with each other outside the fuel cell section 191 and on an outer peripheral surface of the case 130.

A terminal 132 for supplying electric energy generated by the fuel cell section 191 to an external device is provided at the head top portion of the case 130. A plurality of air holes 133 for taking in oxygen necessary for the combustion sections 141A, 142A, 143A, 144A of the compact reformer system 140 to burn the fuel 200 and for discharging carbon dioxide produced by the compact reformer system 140 and the fuel cell section 191 are formed on a periphery of the terminal 132 and at the head top portion of the case 130.

A second drain pipe 134 is provided on the outer peripheral side of the case 130. The second drain pipe 134 protrudes downward from the bottom of the case 130, and is located at a position corresponding to the first drain pipe 106 of the fuel storage module 102. The second drain pipe 134 is a pipe for allowing by-product water produced by the fuel cell section 191 to be distributed, and the by-product water is discharged to the by-product take-in section 107 through the second drain pipe 134 and the first drain pipe 106.

The second drain pipe 134 is coupled to the by-product take-in section 135. A water introduction pipe 136 provided in the case 130 leads to the second drain pipe 134 via the by-product take-in section 135. The by-product take-in section 135 functions as a pump which introduces the by-product water produced by the fuel cell section 191 to the compact reformer system 140 as necessary, and supplies a proper amount of water intended for the compact reformer system 140 to the water introduction pipe 136, and then discharges extra water to the second drain pipe 134. This makes it possible to heighten the concentration of chemical fuel except for water contained in the fuel 199 within the reformed fuel section 108A of the fuel package 108, and increase an amount of produced hydrogen per unit volume of the fuel.

In the fuel storage module 102 and the power generation module 103 as described above, when the fuel storage module 102 storing the fuel package 108 is attached to the power generation module 103, the second drain pipe 134 of the power generation module 103 is connected to the first drain pipe 106 of the fuel storage module 102 on an outer peripheral side of an area where the modules 102, 103 are connected. In this way, the second drain pipe 134 communicates with the first drain pipe 106, thereby making it possible to let the by-product water produced by the power generation module 103 flow from the second drain pipe 134 to the first drain pipe 106 to be discharged to the by-product take-in section 107.

Figure 8:
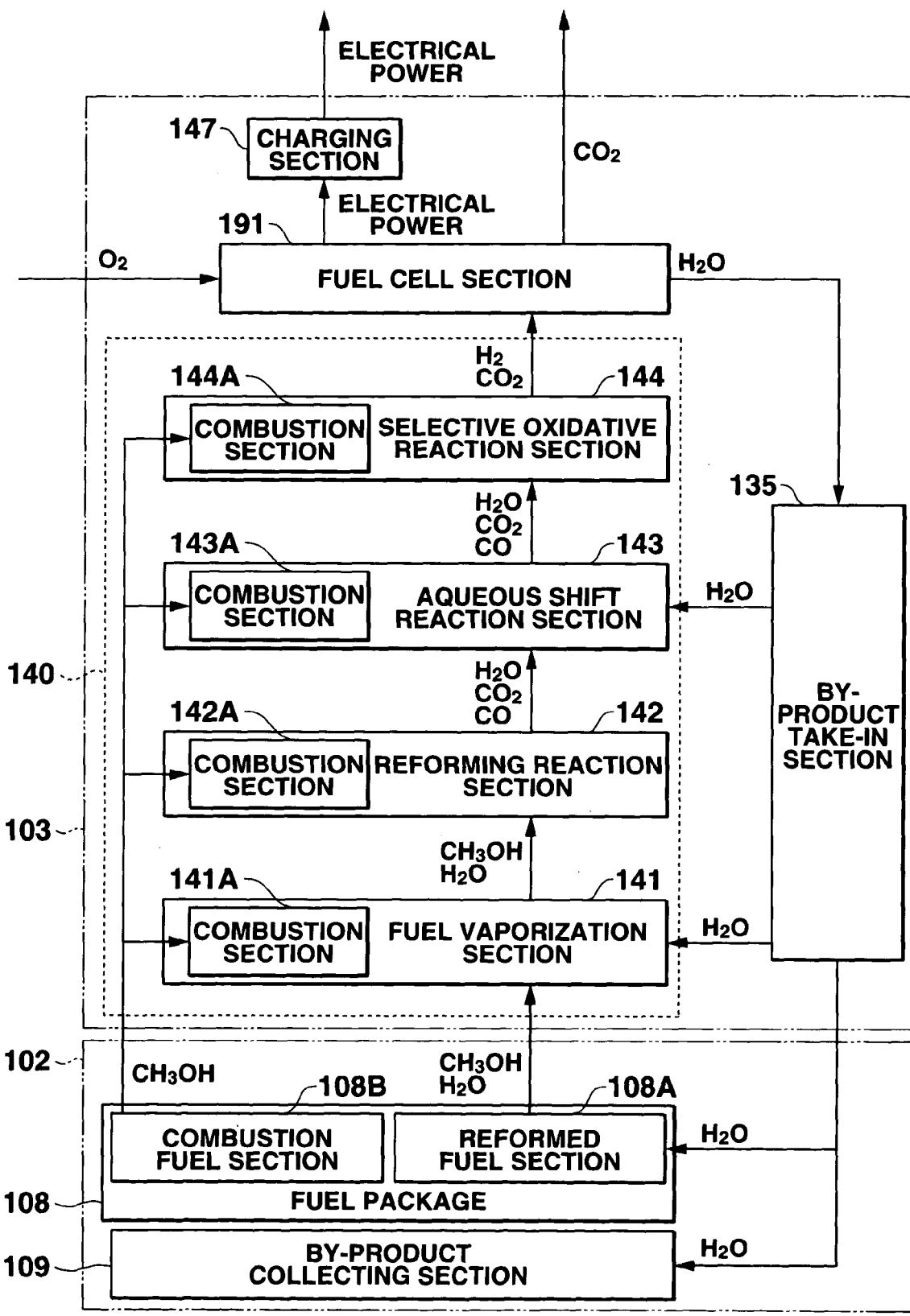
FIG. 8 is a block diagram showing a basic configuration of the power generation system of FIG. 7.

Next, the compact reformer system 140 built in the power generation module 103 will be described. FIG. 8 is a block diagram showing a configuration of the power generation system 101.

As shown in FIG. 8, the compact reformer system 140 comprises the fuel vaporization section 141 for heating the fuel 199 supplied from the fuel package 108 to evaporate the fuel 199; the reforming reaction section 142 for producing hydrogen gas from the fuel 199 vaporized by the fuel vaporization section 141; the aqueous shift reaction section 143 for producing carbon dioxide and hydrogen gas from carbon monoxide gas and water contained in an air-fuel mixture supplied from the reforming reaction section 142 and lowering the concentration of carbon monoxide; and the selective oxidative reaction section 144 for oxidizing carbon monoxide gas contained in the air-fuel mixture supplied from the aqueous shift reaction section 143 to remove carbon monoxide. All sections 141, 142, 143 and 144 are stacked in this order.

The reforming reaction section 142, the aqueous shift reaction section 143 and the selective oxidative reaction section 144 all are applied with the compact chemical reactor shown in FIG. 1, and comprise the combustion sections 142A, 143A, 144A for promoting their chemical reactions. The fuel vaporization section 141 is substantially configured in the same way as the reforming reaction section 142, the aqueous shift reaction section 143 and the selective oxidative reaction section 144, except that the reaction catalyst layer 13 is not provided. These chemical reaction sections are supported by the insulating supports 55 with minimum contact areas to keep in the heat of the thin film heater 17 and the heat generated in the second flow path 29 of the combustion section for heating the first flow path 20 and the reaction catalyst layer 13, and the heat-insulating wall 56 is formed on the periphery of the insulating supports 55 so as to cover the compact chemical reactor.

The heat-insulating walls 56 of all the fuel vaporization section 141, the reforming reaction section 142, the aqueous shift reaction section 143 and the selective oxidative reaction section 144 are constituted of an insulating material with low thermal conductivity formed by glass or the like having a thermal conductivity of 0 to 3 (W/m·K). A radiation reflecting film (not shown) formed of Au, Ag, Al or the like is formed on an inner surface of the heat-insulating wall 56. The radiation reflecting film reflects electromagnetic waves containing infrared radiation at high reflectivity, and reflects radiation heat emitted by the internal chemical reaction sections and combustion sections to hold the heat from being transmitted outside the heat-insulating wall 56. This makes it possible to prevent radiation heat from being released outside the heat-insulating wall 56.

In all sections 141, 142, 143 and 144, the internal space 57 inside the heat-insulating wall 56 is set to the atmosphere under pressure lower than atmospheric pressure, or the internal space inside the heat-insulating wall 56 is charged with multi-halogenated derivative gas (freon (Trade Name) gas) containing fluorine which has low thermal conductivity and is an inert gas or with carbon dioxide gas. Multi-halogenated derivative gas containing fluorine includes, for example, trichlorofluoromethane, dichlorodifluoromethane. Therefore, the structure makes it difficult for the heat of the thin film heater 17 to propagate to the heat-insulating wall 56.

Reaction container main units of all the fuel vaporization section 141, the reforming reaction section 142, the aqueous shift reaction section 143 and the selective oxidative reaction section 144 have a structure in which the second substrate 14 and the third substrate 28 made of a material such as glass with low thermal conductivity are superposed on and joined onto both surfaces of the first substrate 11 formed of a material such as silicon or aluminum having a high thermal conductivity. At a joint portion between the first substrate 11 and the second substrate 14, the zigzag micro flow path 20 is formed along the joint portion, and a cross section of the groove 22 rectangular to a longitudinal direction of the micro flow path 20 is arch-shaped.

The thin film heater 17 is made by forming an electric-resistance heating element or a semiconductor heating element into a thin film, and generates heat with electric energy when an electric current or a voltage is applied thereto. The wires 18, 19 are respectively connected to both ends of the zigzag thin film heater 17, and penetrate the heat-insulating wall 56 to extend to the circuit section 151 (FIG. 7) outside. The thin film heater 17 is properly supplied with electric energy through the lead wires to keep a proper temperature. Portions of the wall 56, through which the wires 18, 19 penetrate are sealed, so that the gas does not leak from/to the internal space 57 and the outside of the heat-insulating wall 56.

The inflow pipe 53 whose one end is coupled to each of the combustion sections 141A, 142A, 143A, 144A has the other end penetrating through the heat-insulating wall 56 to be coupled to the intake nipple portion 138 and the air holes 133 via an unshown valve or pump. The outflow pipe 54 whose one end is coupled to each of the combustion sections 141A, 142A, 143A, 144A has the other end penetrating through the heat-insulating wall 56 to be coupled to the air holes 133 via an unshown valve or pump.

In each of the combustion sections 141A, 142A, 143A, 144A, a mixed fluid in which the fuel 200 of the combustion fuel section 108B sucked in from the supply pipe 112 and oxygen taken in from the air holes 133 are mixed is introduced to the combustion system fluid inflow port 26 via the inflow pipe 53. The mixed fluid causes a combustion reaction due to the combustion catalyst layer 21 in the flow path 29, and its heat propagates to the reaction catalyst layer 13 and a fluid in the flow path 20 via the first substrate 11. A product produced by the combustion reaction is discharged from the combustion system fluid outflow port 27 to the outflow pipe 54.

The outflow pipe 52 of the fuel vaporization section 141 is coupled to the inflow pipe 51 of the reforming reaction section 142, and the outflow pipe 52 of the reforming reaction section 142 is coupled to the inflow pipe 51 of the aqueous shift reaction section 143, and the outflow pipe 52 of the aqueous shift reaction section 143 is coupled to the inflow pipe 51 of the selective oxidative reaction section 144, and the outflow pipe 52 of the selective oxidative reaction section 144 is coupled to the fuel cell section 191.

The inflow pipe 51 whose one end is coupled to the fuel vaporization section 141 has the other end penetrating through the heat-insulating wall 56 to be coupled to the intake nipple portion 137 via an unshown valve or pump. The fuel 199 stored in the fuel package 108 is supplied to the micro flow path 20 of the fuel vaporization section 141 through the intake nipple portion 137 and the inflow pipe 51. A flow volume of the fuel 199 flowing into the flow path 20 of the fuel vaporization section 141 can be adjusted by the circuit section 151 which controls the valve or pump. Further, a flow volume of hydrogen supplied from the selective oxidative reaction section 144 to the fuel cell 191 can be adjusted by the circuit section 151 which controls the valve or pump located between the selective oxidative reaction section 144 and the fuel cell 191.

When the fuel 199 from the fuel storage module 102 is supplied into the flow path 20 via the reaction system fluid inflow port 24, the fuel vaporization section 141 vaporizes the fuel 199 in the flow path 20 heated together with the substrate 11 by the heat (about 120° C.) generated by the combustion section 141A and the thin film heater 17, and allows the vaporized fuel gas for power generation (e.g., $CH_3OH+H_2O$ when the fuel for power generation is a methanol aqueous solution) to flow out from the outflow port 25. In this case, the thin film heater 17 serves as an aid for the combustion section 144A to exactly adjust the temperature in the flow path 20.

The reforming reaction section 142, the aqueous shift reaction section 143 and the selective oxidative reaction section 144 are all provided with the catalyst layer 13 made of a metal, metal oxide or the like on an inner wall surface of the groove 12. In the reforming reaction section 142, the aqueous shift reaction section 143 and the selective oxidative reaction section 144, the catalyst layer 13 may be formed of the same material or may be formed of a different material. Further, in any of the sections 142, 143 and 144, the catalyst layer 13 may be formed of one kind of material or may be formed of plural kinds of materials, and in the case of the plural kinds of materials, the materials may each be disposed at different positions in the micro flow path 20 or may be mixed at the same position in the micro flow path 20.

The catalyst layer 13 of the reforming reaction section 142 is made of a material containing a reformed catalyst made of Cu, ZnO, $Al_2O_3$, for example, and reacts methanol which is a fluid evaporated by the fuel vaporization section 141 with water to promote the production of carbon dioxide and water, as in the following chemical equation (1). This chemical reaction is caused by the heat (about 280° C.) generated by the combustion section 142A and the thin film heater 17.

$$CH_3OH+H_2O \rightarrow 3H_2+CO_2 \qquad (1)$$

The catalyst layer 13 of the aqueous shift reaction section 143 reacts carbon monoxide produced in a significantly small amount by the reforming reaction section 142 with water to promote the production of carbon dioxide and water, as in the following chemical equation (2). This chemical reaction is caused by the heat (about 180° C.) generated by the combustion section 143A and the thin film heater 17.

$$CO+H_2O \rightarrow CO_2+H_2 \qquad (2)$$

The catalyst layer 13 of the selective oxidative reaction section 144 is made of Pt, $Al_2O_3$, for example, and reacts remaining carbon monoxide which has not completely reacted in the aqueous shift reaction section 143 with oxygen to promote the production of carbon dioxide, as in the following chemical equation (3). This chemical reaction is caused by the heat (about 180° C.) generated by the combustion section 144A and the thin film heater 17.

$$2CO+O_2 \rightarrow 2CO_2 \qquad (3)$$

In the present embodiment, the inner wall surface of the micro flow path 20 of the fuel vaporization section 141 is not provided with the catalyst layer, but the catalyst layer which promotes the reaction in the chemical equation (1) may be provided on the inner wall surface of the micro flow path 20 of the fuel vaporization section 141.

When the vaporized fuel 199 supplied from the fuel vaporization section 141 is supplied into the flow path 20 via the inflow port 26, the reforming reaction section 142 causes the reaction as in the chemical equation (1) due to the heat generated by the thin film heater 17 and the combustion section 142A, thus producing hydrogen, by-product carbon dioxide, and in some cases a significantly small amount of carbon monoxide. Then, a produced fluid such as hydrogen flows out from the outflow port 25.

Water ($H_2O$) on the left side of the above equation (1) may be water contained in the fuel 199 of the fuel storage module 102 at an initial stage of the reaction, but the by-product take-in section 135 may collect water produced by power generation of the fuel cell section 191 described later to supply the water to the reforming reaction section 142. In addition, a supply source of water ($H_2O$) on the left side of the above equation (1) may be only the fuel cell section 191, may be the fuel cell section 191 and the fuel storage module 102, and may be only the fuel storage module 102.

Carbon monoxide which is the by-product in the fluid flowing from the outflow port 25 of the reforming reaction section 142 to the inflow port 26 of the aqueous shift reaction section 143 reacts with water in the space within the flow path 20 of the aqueous shift reaction section 143 to produce hydrogen due to the heat generation of the thin film heater 17 and the combustion section 143A, so that a fluid containing a higher concentration of hydrogen flows out from the outflow port 25 in the aqueous shift reaction section 143.

Carbon monoxide which remains in the fluid flowing from the outflow port 25 of the aqueous shift reaction section 143 to the inflow port 26 of the selective oxidative reaction section 144 reacts with oxygen in the space within the flow path 20 of the selective oxidative reaction section 144 to become carbon dioxide due to the heat generation of the thin film heater 17 and the combustion section 144A. Thus, a fluid containing hydrogen and carbon dioxide flows out from the outflow port 25 in the selective oxidative reaction section 144.

In this way, the reforming reaction section 142 reforms the fuel 199 to make hydrogen to be supplied to the fuel cell section 191, and the aqueous shift reaction section 143 and the selective oxidative reaction section 144 remove and detoxify carbon monoxide which is a toxic by-product produced by the reforming reaction section 142.

The fluid after a series of reactions described above contains hydrogen and carbon dioxide, and out of these products, carbon dioxide may be released outside from the air holes 133.

Figure 9:
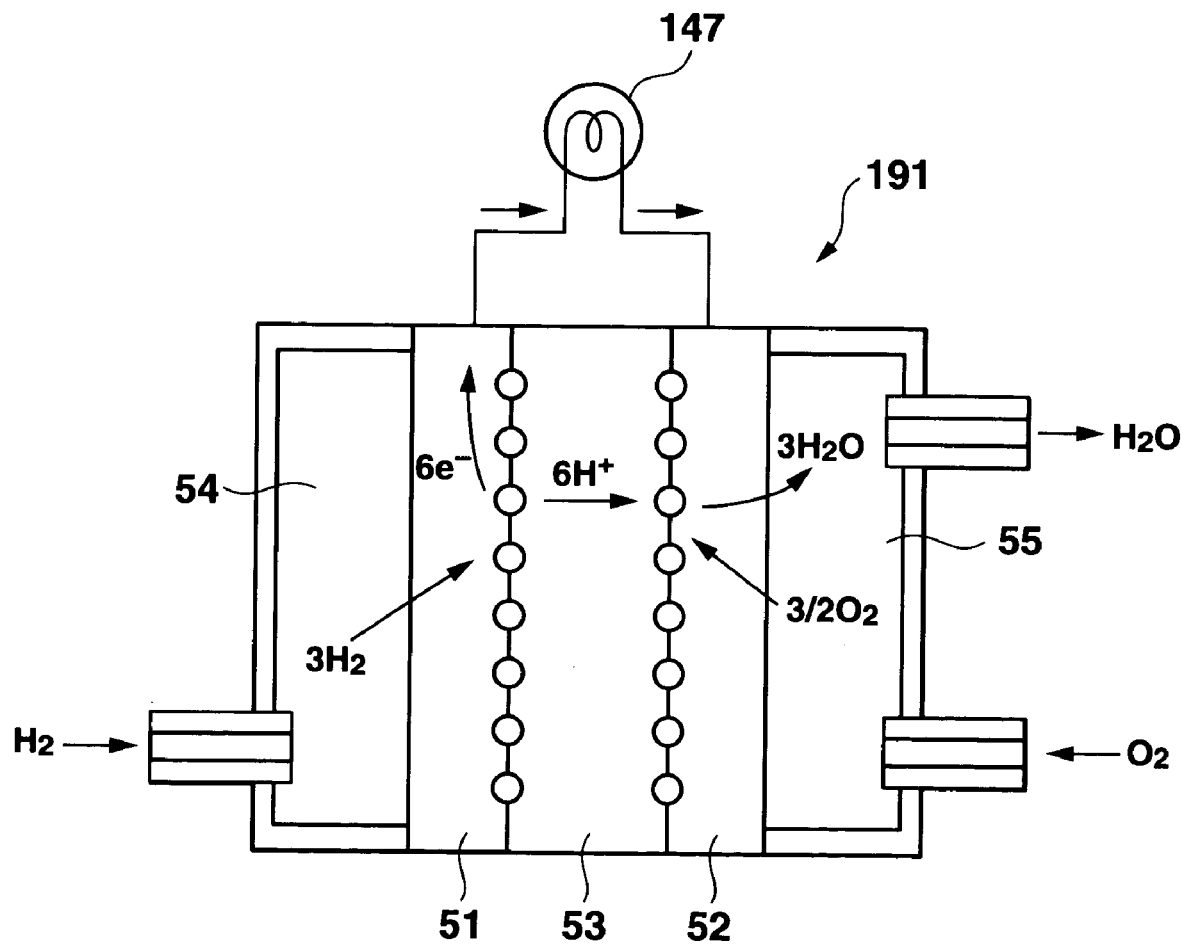
FIG. 9 is a schematic configuration view of a fuel cell section and a charging section of a fuel cell system shown in FIG. 4.

The fuel cell section 191 is constituted of a solid macromolecule type fuel cell as shown in FIG. 9. The fuel cell section 191 is constituted by having a cathode 51 made of a carbon electrode supporting catalysts such as Pt and C; an anode 52 made of a carbon electrode supporting catalysts such as Pt, Ru and C; and a film-like ion exchange film 53 placed between the cathode 51 and anode 52, thereby supplying electric power to a charging section 147 constituted of a secondary cell or a capacitor provided between the cathode 51 and anode 52.

In this case, a space section 54 is provided outside the cathode 51. Hydrogen from the selective oxidative reaction section 144 is supplied into the space section 54, and thus supplied to the cathode 51. Further, a space section 55 is provided outside the anode 52. Oxygen taken in from the atmosphere via a check valve is supplied into the space section 55, and thus supplied to the anode 52.

Hydrogen ions (proton $H^+$) in which electrons ($e^-$) have been separated from hydrogen are produced on a side of the cathode 51 as shown in the following equation (4), and pass to a side of the anode 52 via the ion exchange film 53, and then the cathode 51 takes out electrons ($e^-$) therefrom to supply them to the charging section 147.

$$3H_2 \rightarrow 6H^+ + 6e^- \qquad (4)$$

On the other hand, supplied electrons ($e^-$), hydrogen ions ($H^+$) passed through the ion exchange film 53 and oxygen react on the side of the anode 52, thereby producing by-product water, as shown in the following equation (5).

$$6H^+ + (3/2)O_2 + 6e^- \rightarrow 3H_2O \qquad (5)$$

The series of electrochemical reactions described above (equation (4) and equation (5)) proceed under an environment at a relatively low temperature of about room temperature to 80° C., and water is basically the only by-product except for electric power. The electric power generated by the fuel cell section 191 is supplied to the charging section 147, whereby the charging section 147 is charged and the charging section 147 properly supplies electricity to an external device via the terminal 132.

Water as the by-product produced by the fuel cell section 191 is finally collected by the by-product collecting section 109 via the by-product take-in section 135, so that it does not flow outside the power generation system 101. Furthermore, while at least one of the fuel vaporization section 141 and the aqueous shift reaction section 143 is operating as described above, at least part of water produced by the fuel cell section 191 may be controlled to be supplied to the operating compact reaction section.

Figure 10:
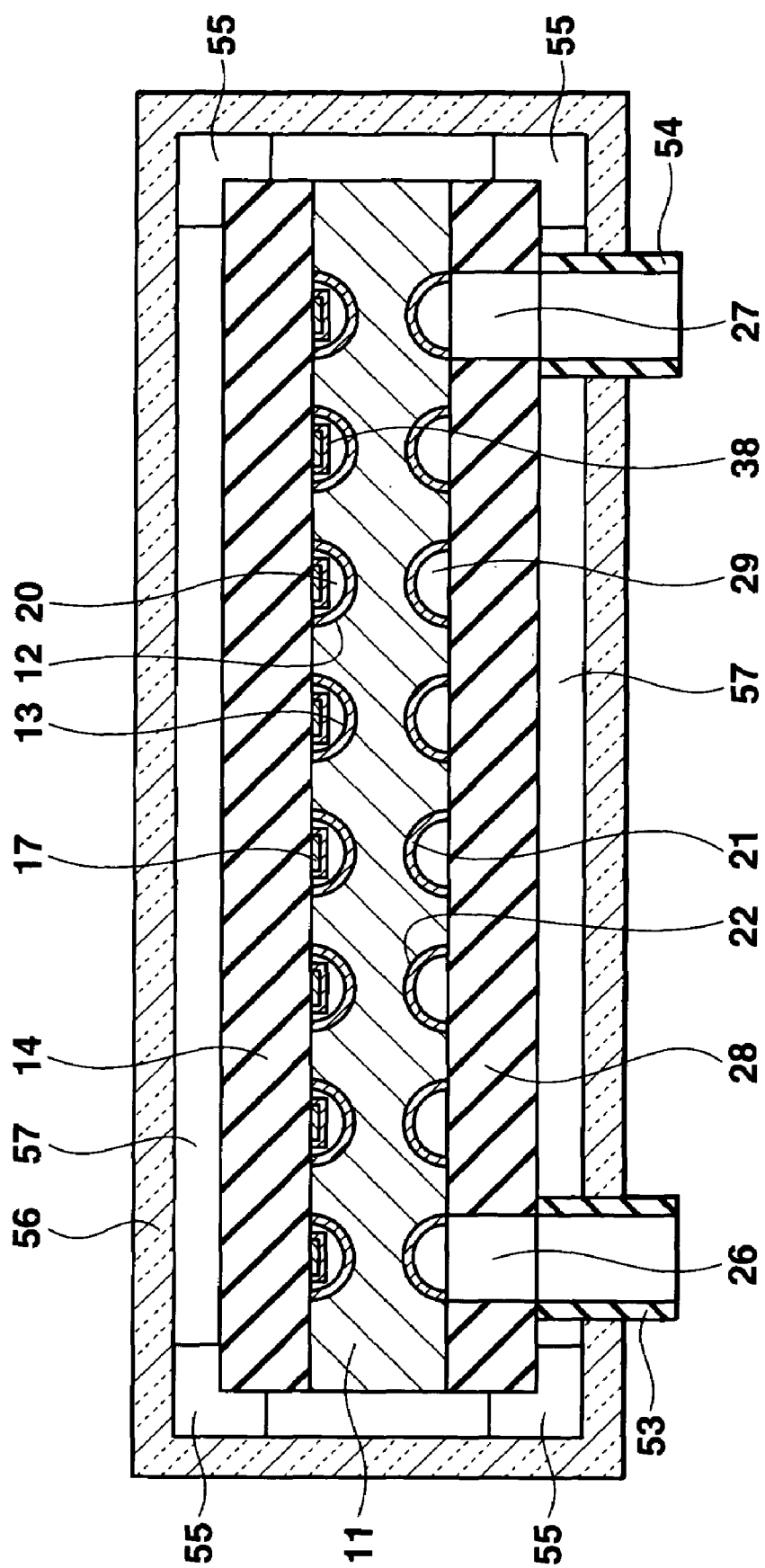
FIG. 10 is a sectional view of a portion of the compact chemical reactor as a second embodiment of the present invention.

A second embodiment of the present invention is shown in FIG. 10. FIG. 10 is a view corresponding to FIG. 4 of the first embodiment, and the surface of the thin film heater 17 is provided with a reaction catalyst layer 38 made of the same catalyst as that of the reaction catalyst layer 13. Such a configuration makes it possible to increase a superficial area of the catalyst in the first flow path 20 and achieve a relatively high reaction rate in the first flow path 20 as compared with the chemical reactor in the first embodiment, so that the length of the flow path 20 can be shortened and the chemical reactor can be made more compact.

Figure 11:
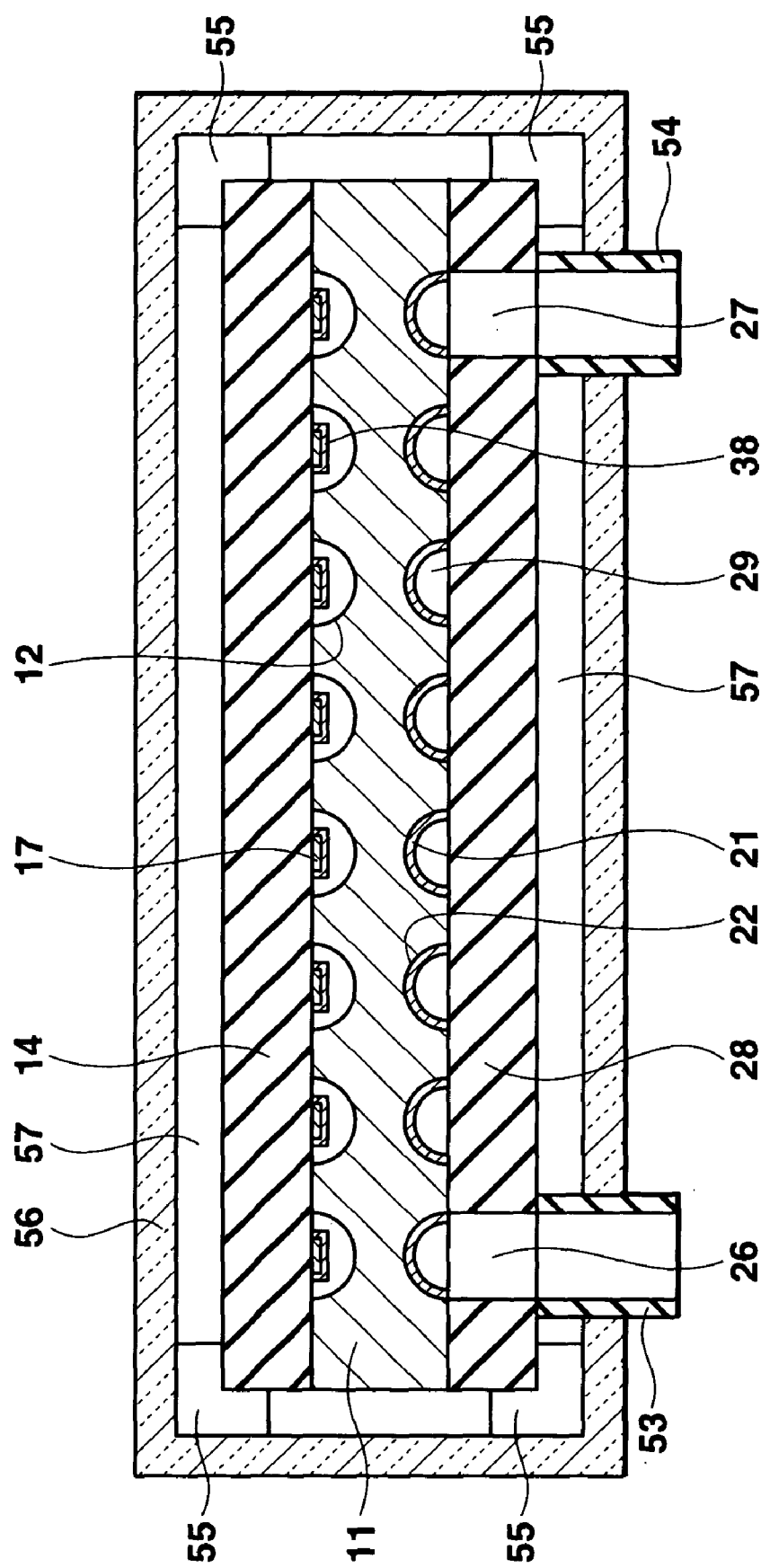
FIG. 11 is a sectional view of a portion of the compact chemical reactor as a third embodiment of the present invention.

As in a third embodiment shown in FIG. 11, the reaction catalyst layer 38 may be provided only on the surface of the thin film heater 17 without providing a catalyst layer 13 in the groove 12. In the chemical reactors shown in the second and third embodiments described above, the reaction catalyst layer 38 directly contacts the thin film heater 17, so that a heat loss of the thin film heater 17 is favorably small.

Figure 12:
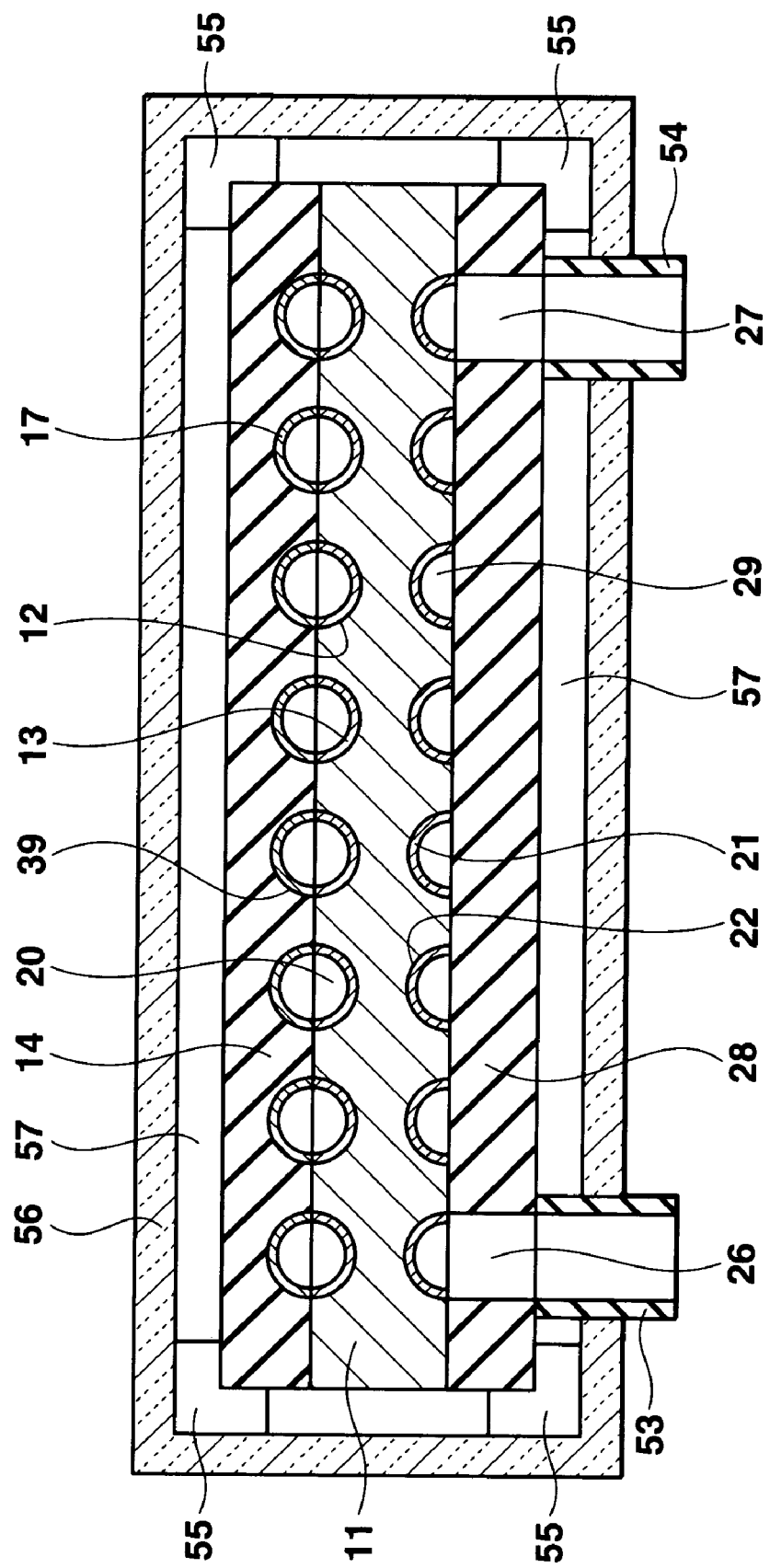
FIG. 12 is a sectional view of a portion of the compact chemical reactor as a fourth embodiment of the present invention.

In a fourth embodiment, as shown in FIG. 12, the groove 12 and a groove 39 are respectively formed in the opposite surfaces of the first substrate 11 and the second substrate 14 so that they overlap each other. The reaction catalyst layer 13 may be formed on the surface of the groove 12, and the thin film heater 17 may be provided on the surface of the groove 39. In this case, if the chemical reactor is one of the reforming reaction section 142, the aqueous shift reaction section 143 and the selective oxidative reaction section 144, the reaction catalyst layer 13 is provided on the inner wall of the groove 12 of the first substrate 11. Alternately, if the chemical reactor is the fuel vaporization section 141, the reaction catalyst layer 13 is not needed. The thin film heater 17 is electrically connected to the circuit section 151 by wires provided on the second substrate 14 similarly to the wires 18, 19 in the first embodiment.

In the fourth embodiment described above, the reaction catalyst layer 13 for a chemical reaction is provided on the inner wall of the groove 12 of the first substrate 11, and the thin film heater 17 is provided on the inner wall of the groove 39 of the second substrate 14, but the thin film heater 17 may be provided on the inner wall of the groove 12 of the first substrate 11 and the reaction catalyst layer 13 may be provided on the inner wall of the groove 39 of the second substrate 14.

Figure 13:
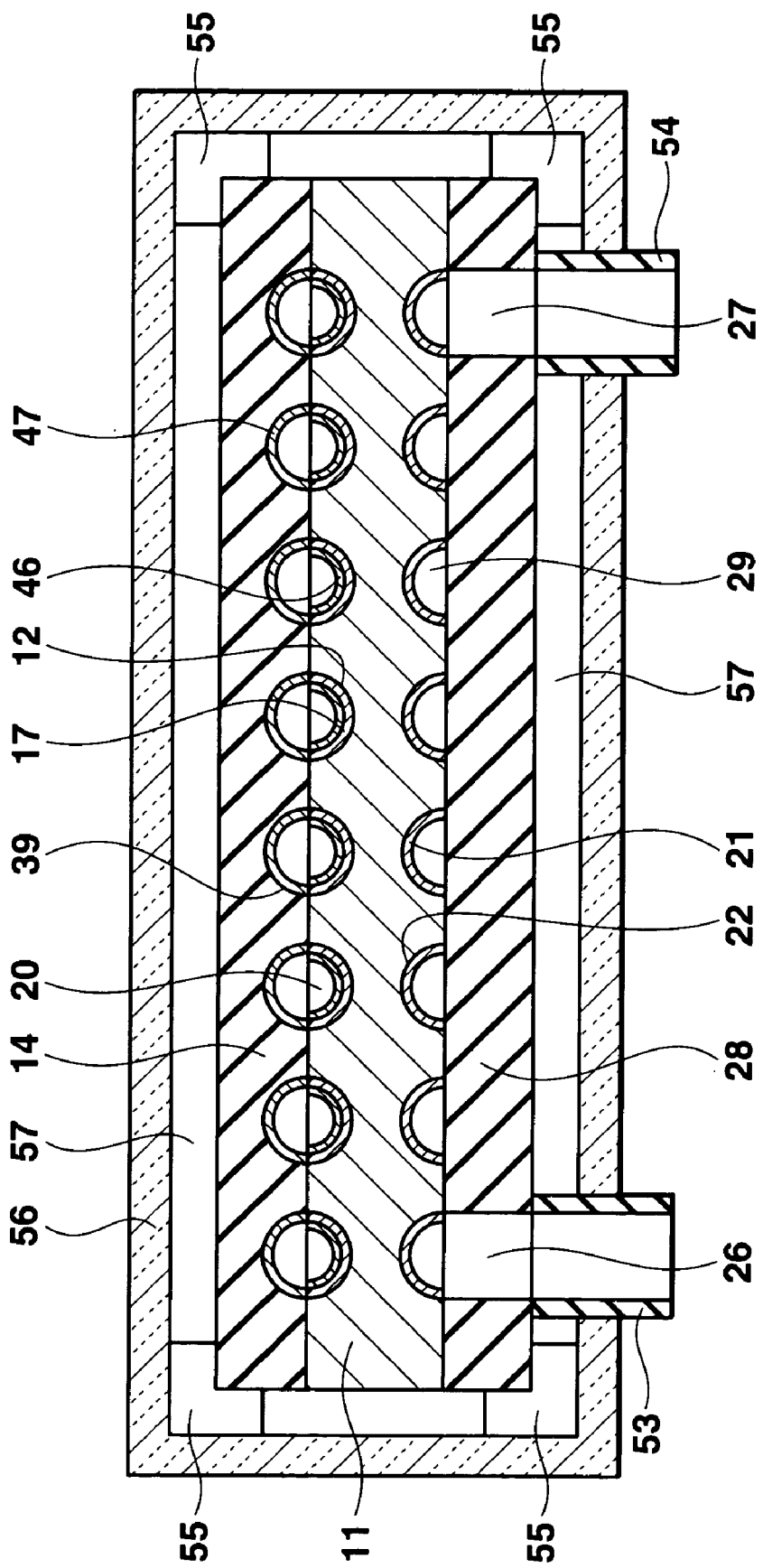
FIG. 13 is a sectional view of a portion of the compact chemical reactor as a fifth embodiment of the present invention.

As in a fifth embodiment shown in FIG. 13, the thin film heater 17 may be formed on the surface of the groove 12 of the first substrate 11, and a reaction catalyst layer 46 may be formed on the surface of the thin film heater 17, and the groove 39 may be provided in the second substrate 14 to overlap the groove 12 of the first substrate 11. A reaction catalyst layer 47 may be provided on the surface of the groove 39. In this case, the reaction catalyst layer 46 and the reaction catalyst layer 47 may be made of the same material or different materials, and may have the same thickness or different thickness. In the fifth embodiment, the reaction catalyst layer 46 and the reaction catalyst layer 47 are formed entirely in the flow path 20, so that it is possible to efficiently cause a reaction. In the fifth embodiment above, the reaction catalyst layer 47 is provided on the inner wall of the groove 39 of the second substrate 14, but the reaction catalyst layer 47 may be dispensed with.

Figure 14:
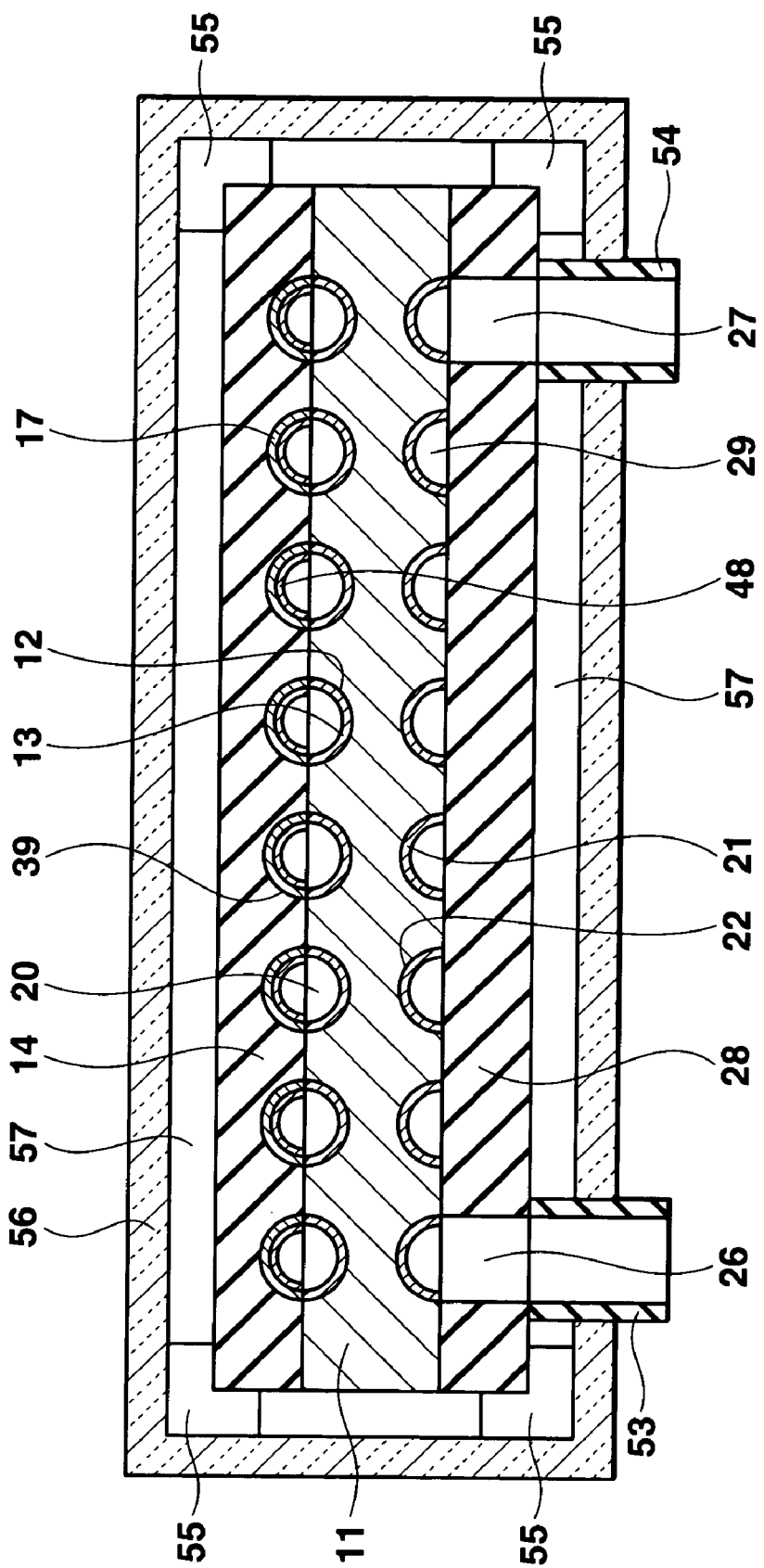
FIG. 14 is a sectional view of a portion of the compact chemical reactor as a sixth embodiment of the present invention.

As in a sixth embodiment shown in FIG. 14, the reaction catalyst layer 13 may be formed on the surface of the groove 12 of the first substrate 11, and the groove 39 may be formed in the second substrate 14 to overlap the groove 12 of the first substrate 11, and the thin film heater 17 may be provided on the surface of the groove 39. A reaction catalyst layer 48 may be formed on the surface of the thin film heater 17. In the sixth embodiment, the reaction catalyst layers 13 and 48 are formed entirely in the flow path 20, so that it is possible to efficiently cause a reaction. The thin film heater 17 is connected to the circuit section 151 by wires provided on the second substrate 14 similarly to the wires 18, 19 in the first embodiment. In the sixth embodiment above, the reaction catalyst layer 13 is provided on the inner wall of the groove 12 of the first substrate 11, but the reaction catalyst layer 47 may be dispensed with.

In the sixth embodiment described above, the thin film heater 17 is provided only on the inner wall of the groove 39 of the second substrate 14, but the thin film heater 17 may also be provided on the inner wall of the groove 12 of the first substrate 11 and the reaction catalyst layer 13 may be provided on its surface. With such a configuration, the thin film heaters 17 located at the top and bottom directly heat the reaction catalyst layer 13 and the reaction catalyst layer 39, thereby allowing a finer adjustment of the temperature in the flow path 20.

Figure 15:
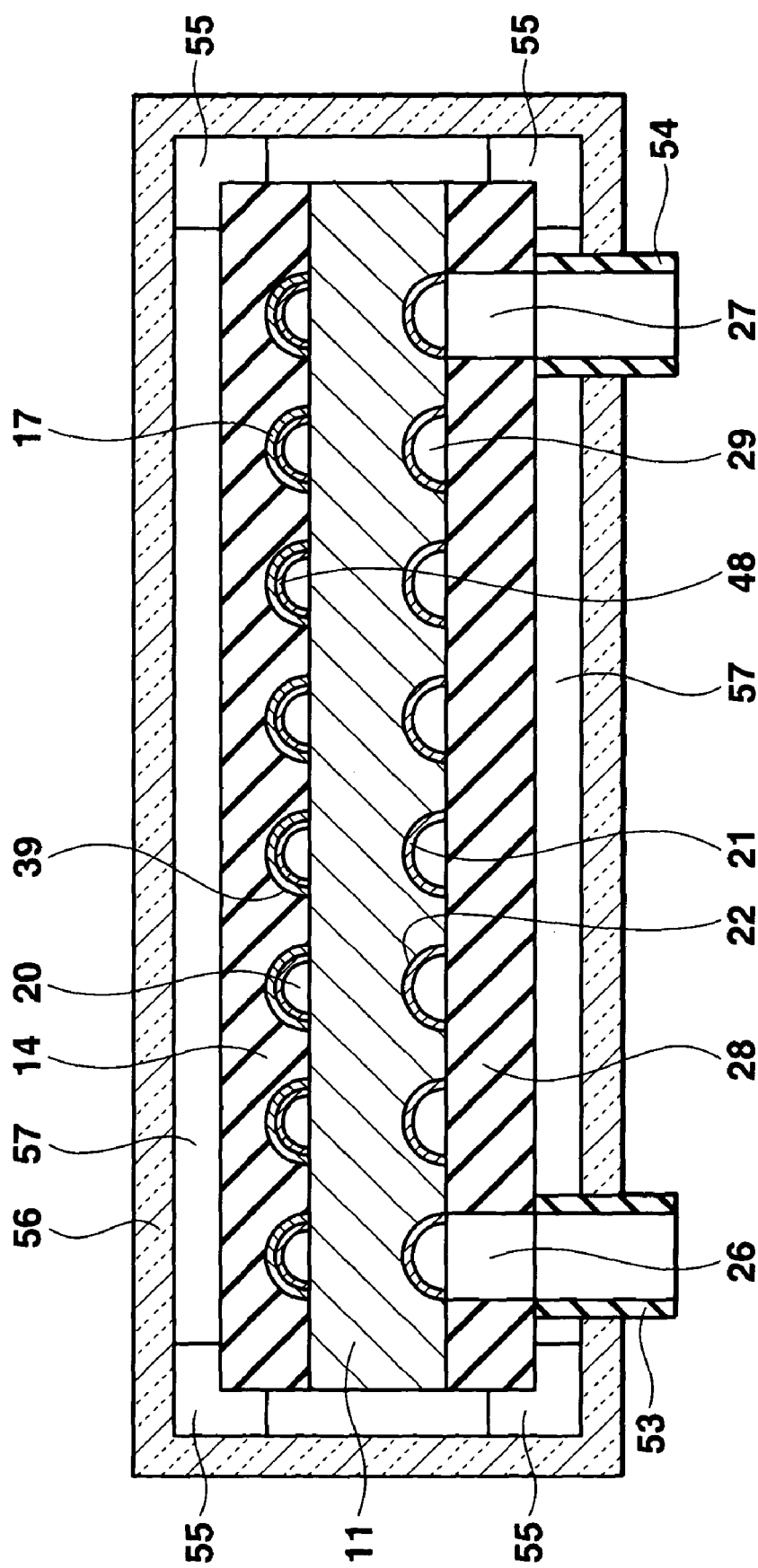
FIG. 15 is a sectional view of a portion of the compact chemical reactor as a seventh embodiment of the present invention.

Furthermore, as in a seventh embodiment shown in FIG. 15, a groove which is covered with the reaction catalyst layer is not formed on the first substrate 11, and only the second substrate 14 may be provided with the groove 39 to constitute the first flow path 20. The reaction catalyst layer 48 may be provided on the thin film heater 17 that is provided on the surface of the groove 39.

Figure 16:
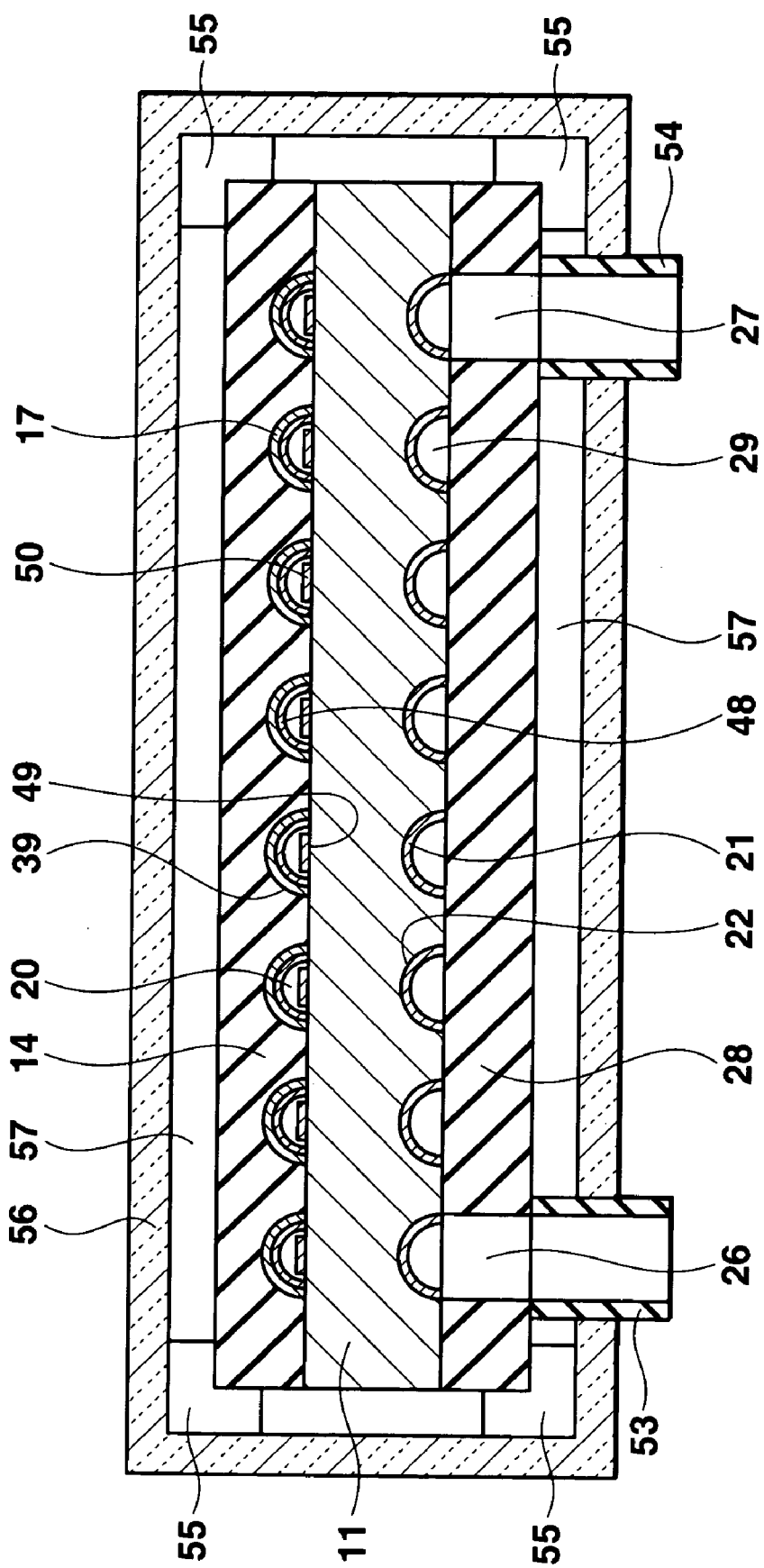
FIG. 16 is a sectional view of a portion of the compact chemical reactor as an eighth embodiment of the present invention.

Still further, as in an eighth embodiment shown in FIG. 16, the thin film heater 17 may be provided on the surface of the groove 39 which is on a side of the second substrate 14, and the first reaction catalyst layer 48 may be provided on the thin film heater 17, and a reaction catalyst layer 50 may be provided on a surface 49 of the first substrate 11 opposite to the groove 39.

Figure 17:
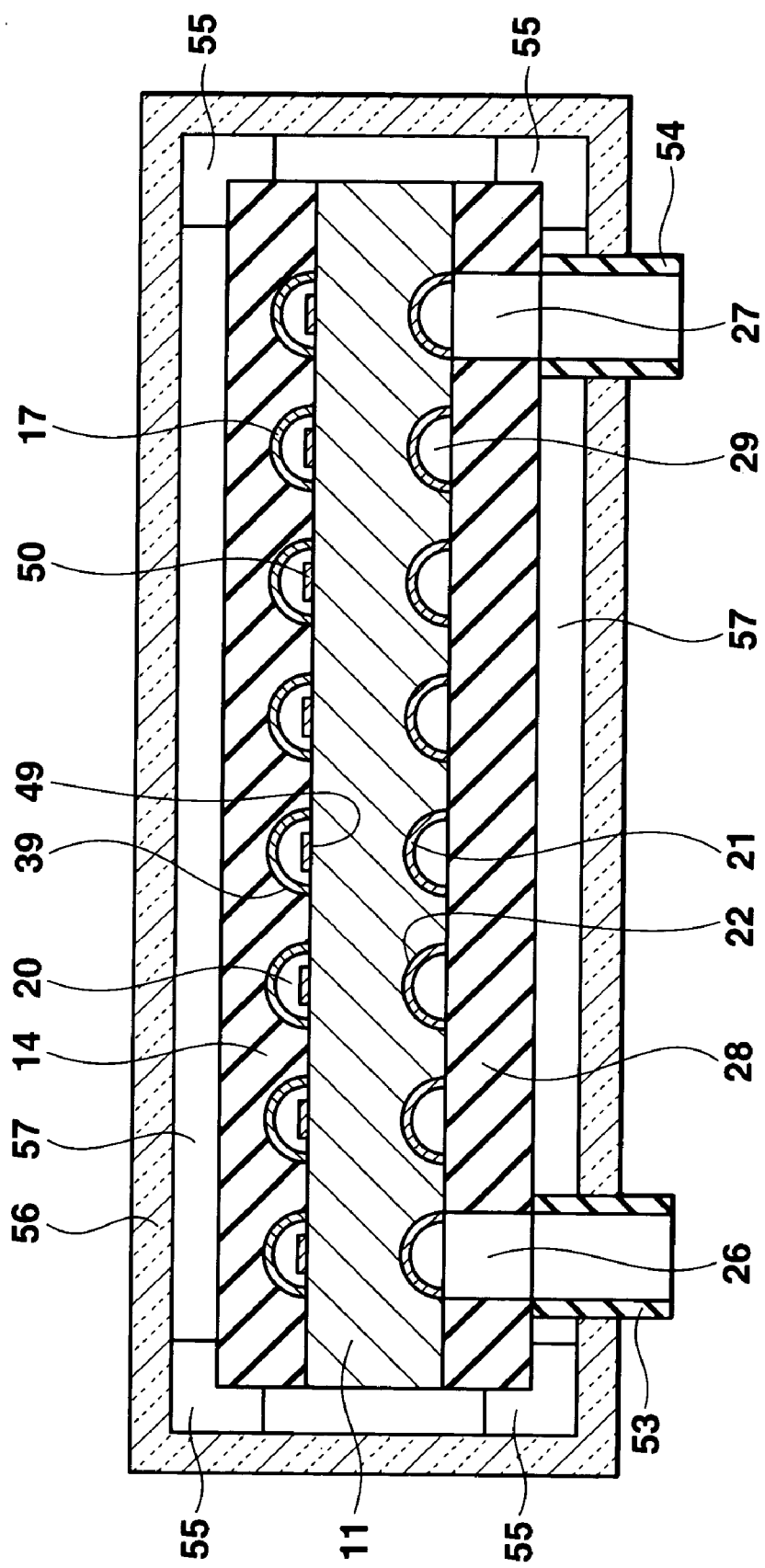
FIG. 17 is a sectional view of a portion of the compact chemical reactor as a ninth embodiment of the present invention.

Further yet, as in a ninth embodiment shown in FIG. 17, the thin film heater 17 may be provided on the surface of the groove 39 which is on the side of the second substrate 14, and the reaction catalyst layer 50 may be provided on the surface 49 of the first substrate 11 opposite to the groove 39 without providing a reaction catalyst layer on the thin film heater 17.

In the configuration of the fourth embodiment shown in FIG. 12 to the ninth embodiment shown in FIG. 17, at least one side of one substrate on which the thin film heater 17 is provided protrudes further than one corresponding side of the other substrate, and both ends of the thin film heater 17 or the ends of the wires 18, 19 are disposed in the protruding portion, so that both ends of the thin film heater 17 or the ends of the wires 18, 19 are exposed outside the other substrate.

Figure 18:
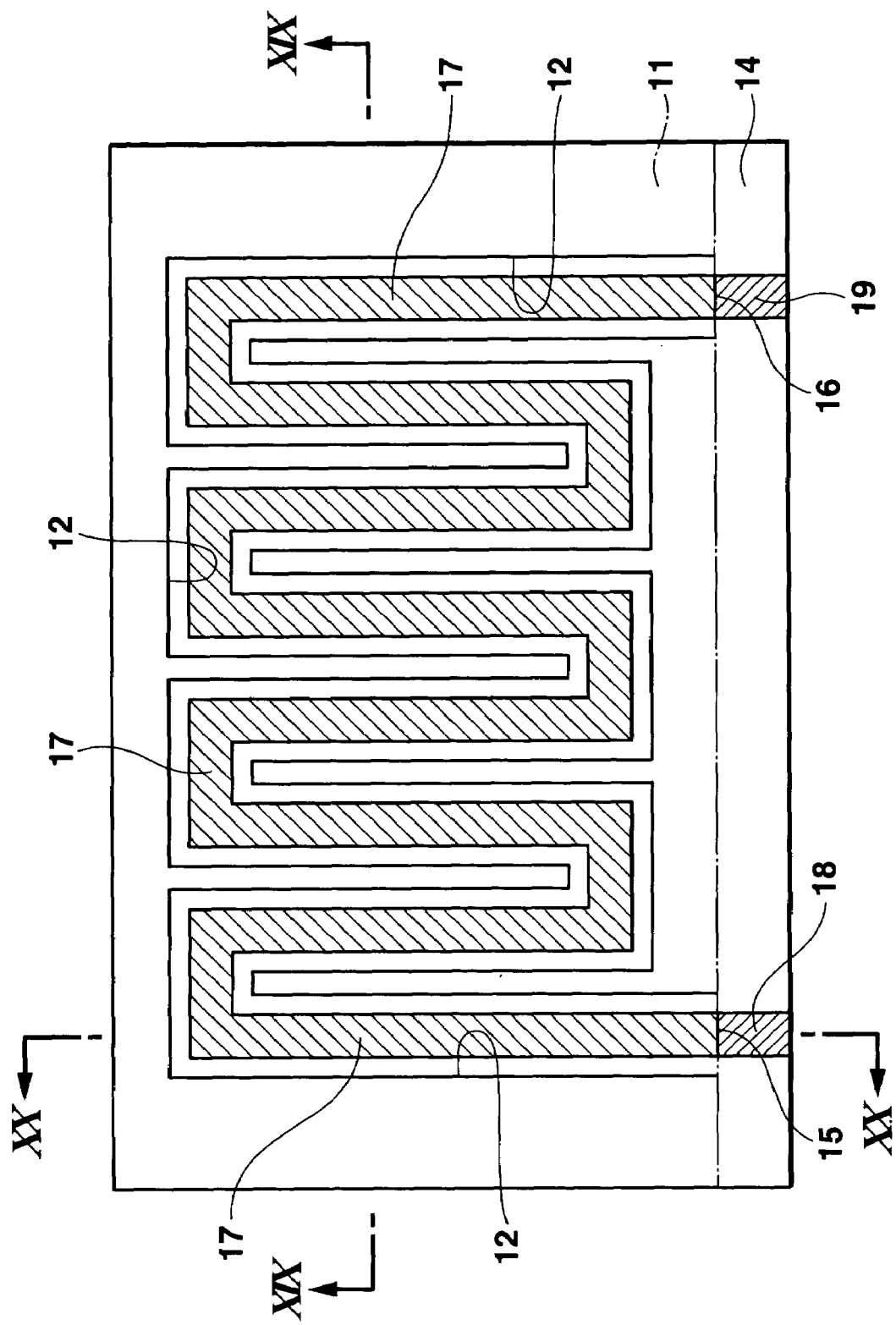
FIG. 18 is a schematic transmitted plan view showing a relative position of the thin film heater of the compact chemical reactor as a tenth embodiment of the present invention.
Figure 19:
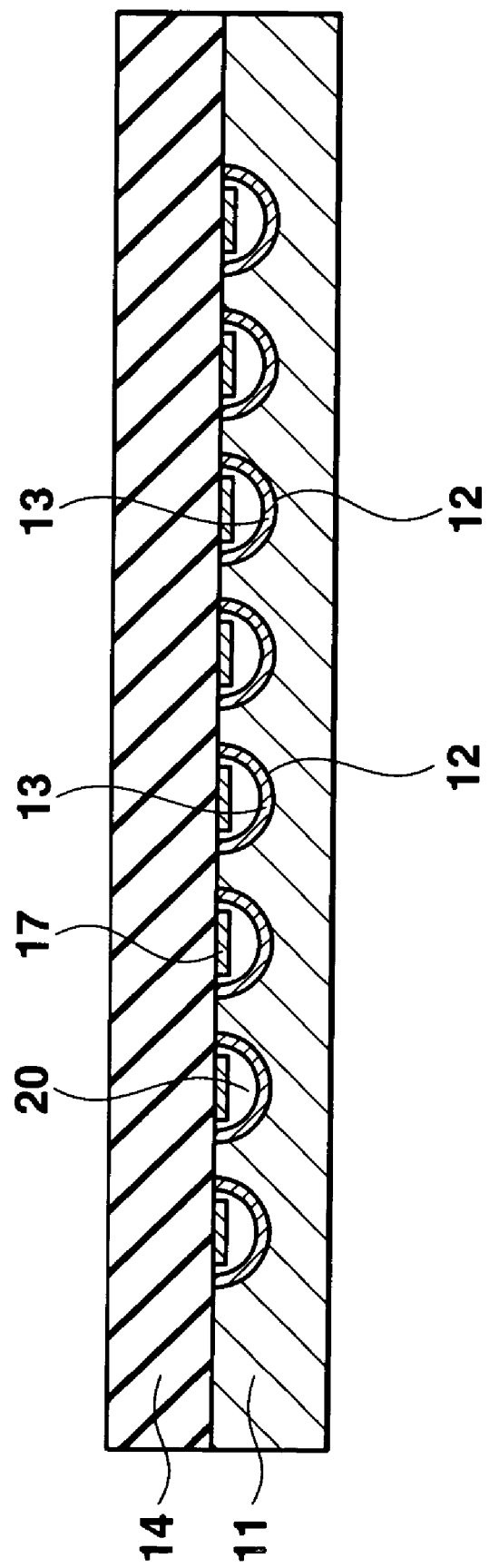
FIG. 19 is a sectional view along the line XIX—XIX of FIG. 18.
Figure 20:
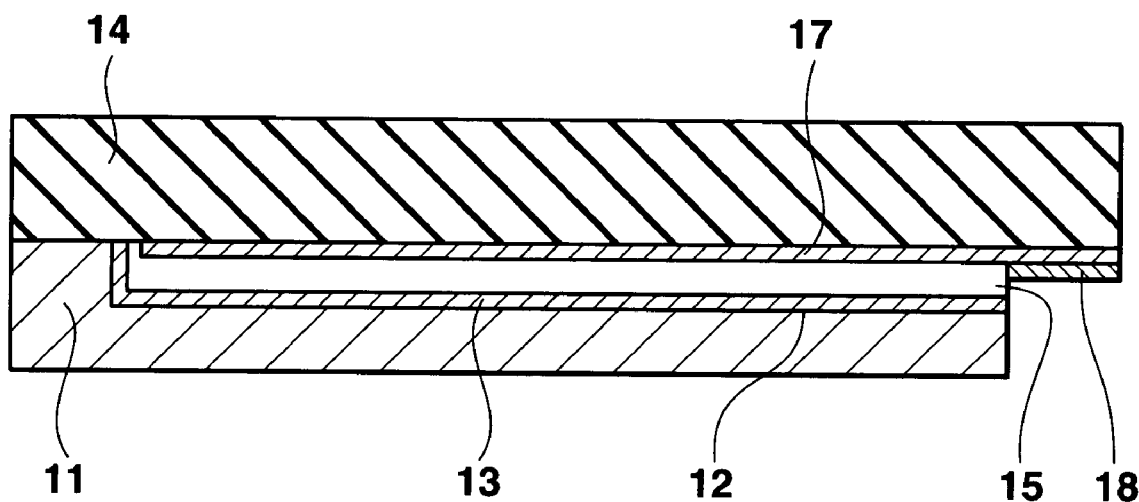
FIG. 20 is a sectional view along the line XX—XX of FIG. 18.

In each of the embodiments described above, the combustion section which generates heat by a combustion reaction in the second flow path 29 is provided to promote the chemical reaction in first flow path 20, but the chemical reactor has a configuration without the combustion sections in a tenth embodiment. FIG. 18 is a transmitted plan view showing the compact chemical reactor as the tenth embodiment, FIG. 19 is a sectional view along the line XIX—XIX of FIG. 18, and FIG. 20 is a sectional view along the line XX—XX of FIG. 18.

The meandering micro groove 12 is formed in one surface of the first substrate 11. Both ends of the groove 12 extend to predetermined two positions on the end face of one side of the first substrate 11. The reaction catalyst layer 13 is provided on the inner wall surface of the groove 12.

The second substrate 14 is anode-joined to one surface of the first substrate 11, and a space enclosed by the groove 12 of the first substrate 11 and covered with the second substrate 14 is the micro flow path 20 through which a fluid flows. The length of the second substrate 14 is the same as that of the first substrate 11, but the width of the second substrate 14 is slightly larger than that of the first substrate 11. In a state where the first substrate 11 and the second substrate 14 are anode-joined, one side portion of the second substrate 14 protrudes from the first substrate 11. Both ends of the groove 12 are open, and the openings are an inflow port 15 and an outflow port 16.

The meandering thin film heater 17 is provided at a position corresponding to the groove 12 on a surface of the second substrate 14 opposite to the first substrate 11. The thin film heater 17 has a width a little smaller than that of the groove 12, and is disposed in the flow path 20. When a chemical reaction in the compact chemical reactor needs predetermined heat, the thin film heater 17 supplies predetermined heat energy to the reaction catalyst layer 13 in the groove 12 during the chemical reaction.

Both ends of the thin film heater 17 protrude from the inflow port 15 and the outflow port 16 to extend to predetermined two positions on the end face of one side of the second substrate 12. The wires 18, 19 are respectively provided on both the extending portions of the thin film heater 17. The thin film heater 17 is a resistive element which heats by a voltage applied to the wires 18, 19.

Figure 22:
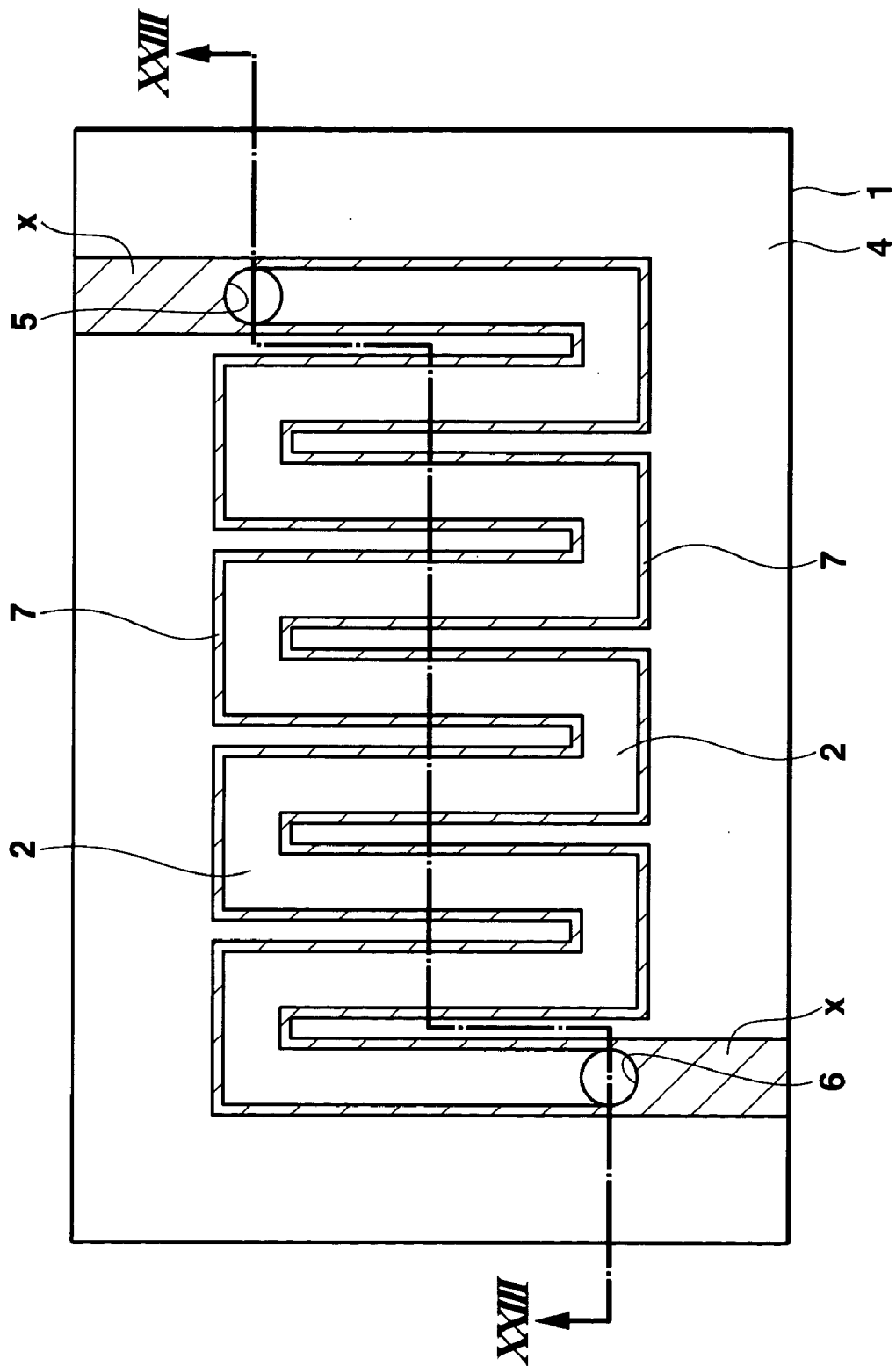
FIG. 22 is a transmitted plan view of one example of a conventional compact chemical reactor.
Figure 23:
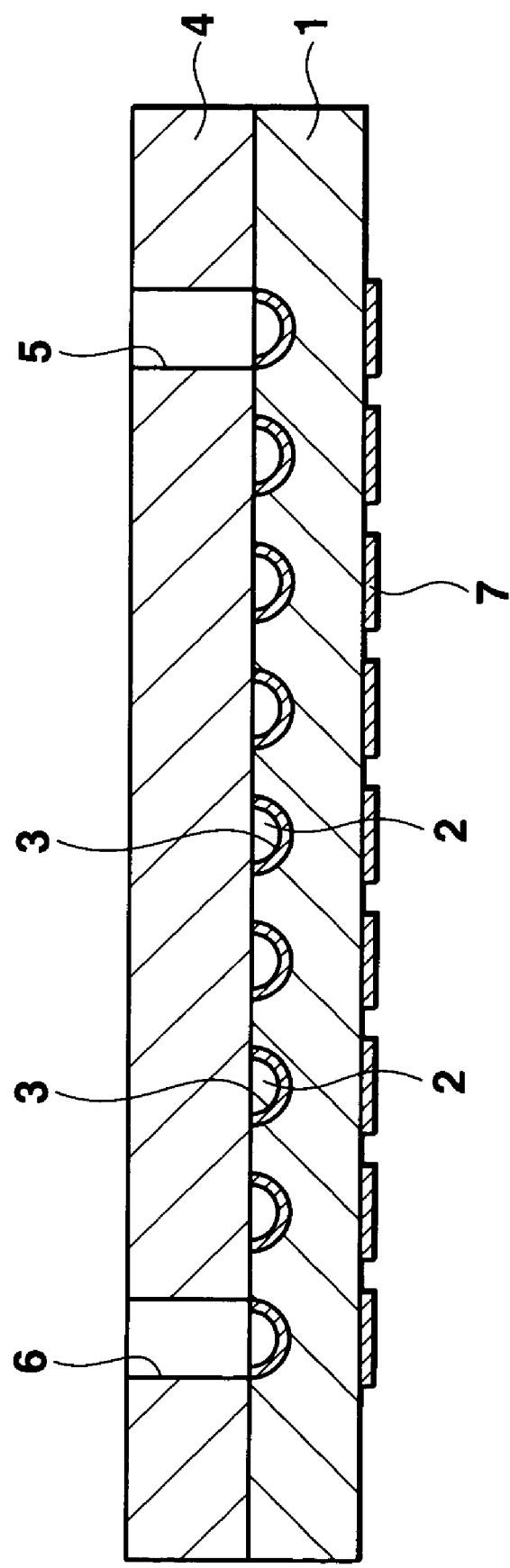
FIG. 23 is a sectional view along the line XXIII—XXIII of FIG. 22.

Here, reasons will be described why both ends of the groove 12 extend to the predetermined two positions on one side of the first substrate 11 in this compact chemical reactor. The thin film heater 17 or its wires 18, 19 are pulled to the end face of the substrate on which it/they is/are provided so as to be connected to the circuit section 151. In the configuration wherein the thin film heater 17 is provided in the groove 12 as in the present invention, for example, if the inflow port 5 and the outflow port 6 are provided on the first substrate 11 as in the compact reactor shown in FIG. 22 and FIG. 23, and if both ends of the groove 12 do not extend to the predetermined two positions on one side of the first substrate 11 but are set to be up to the inflow port 5 and the outflow port 6 as in the compact reactor shown in FIG. 22, because a flow path 2 is not provided on a substrate 1 in an area X of FIG. 22, a clearance is produced between the first substrate 11 and the second substrate 14 due to the thickness of the thin film heater 17 and the wires 18, 19 in the same area X in the present invention, thus causing a leakage in the flow path 20 and making it impossible to sufficiently anode-join the first substrate 11 and the second substrate 14.

On the contrary, in the tenth embodiment described above, both ends of the groove 12 extend to the predetermined two positions on one side of the first substrate 11, so that both ends of the thin film heater 17 can be disposed in the extending portions. This keeps the first substrate 11 from contacting the thin film heater 17 and the wires 18, 19, thereby making no clearance in the groove 12 and thus making it possible to positively anode-join the first substrate 11 and the second substrate 14. Further, since both ends of the thin film heater 17 protrude from both ends of the groove 12 (the inflow port 15 and the outflow port 16) and the wires 18, 19 are provided on both the protruding portions, it is possible to easily and positively connect external wires (not shown) to the wires 18, 19.

Figure 21:
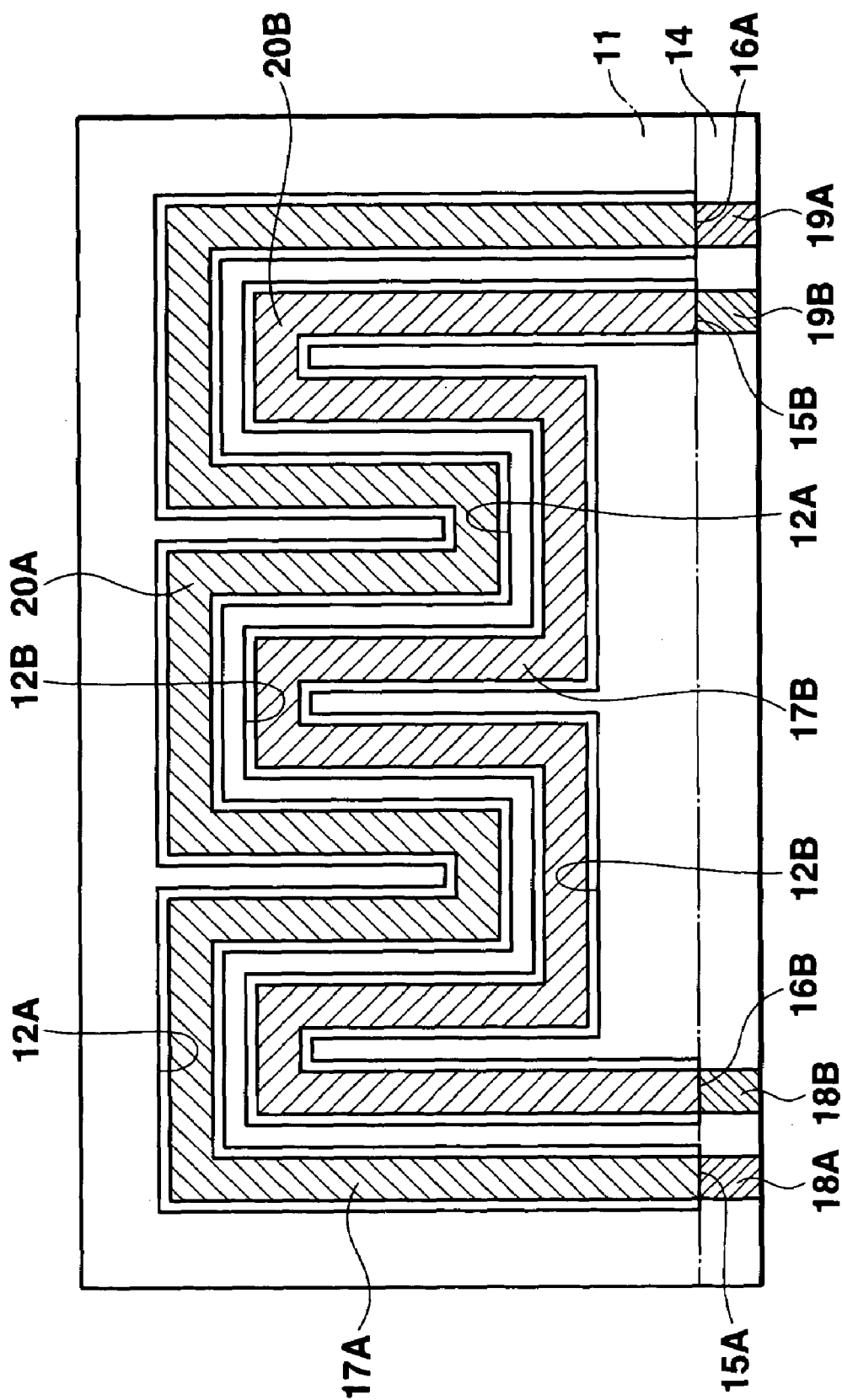
FIG. 21 is a sectional view of a portion of the compact chemical reactor as an eleventh embodiment of the present invention.

Only one groove 12 is provided between the first substrate 11 and the second substrate 14 in the embodiments described above, which is not limited, and a first groove 12A which is constituted by a meandering groove provided on the first substrate 11 and a second groove 12B provided along the first groove 12A may be arranged in parallel, as in an eleventh embodiment shown in FIG. 21.

In this case, the first groove 12A links a first inflow port 15A and a first outflow port 16A that are provided on the end face of the first substrate 11, and an unshown catalyst layer is provided on a surface of the first groove 12A which is on the side of the first substrate 11. A first thin film heater 17A formed in the first groove 12A on a surface of the second substrate 14 is connected to a first wire 18A and a second wire 19A that are each provided in the vicinity of the first inflow port 15A and in the vicinity of the first outflow port 16A, and is thus controlled to be heated by a voltage applied across the first wire 18A and the second wire 19A.

The second groove 12B links a second inflow port 15B and a second outflow port 16B that are provided on the end face of the first substrate 11, and an unshown catalyst layer is provided on a surface of the second groove 12B which is on the side of the first substrate 11. This catalyst layer may be the same as or different from the catalyst layer in the first groove 12A. A second thin film heater 17B formed in the second groove 12B in a surface of the second substrate 14 is connected to a second wire 19B and a second wire 18B that are each provided in the vicinity of the second inflow port 15B and in the vicinity of the second outflow port 16B, and is thus controlled to be heated by a voltage applied across the second wire 18B and the second wire 19B.

The eleventh embodiment in which the two flow paths are provided can apply arrangement configurations as shown in any of the first to tenth embodiments. It is needless to mention that three or more flow paths may be provided in the substrate. In addition, fluids flowing in flow paths 20A and 20B may be different from each other, and chemical reactions caused in the flow paths may be different from each other, and moreover temperatures at which the first thin film heaters 17A and 17B are heated may be different from each other.

Furthermore, the thin film heater is provided only in the flow path in the embodiments described above, which is not limited, and the thin film heater may be provided outside the flow path in addition to the thin film heater in the flow path.

In addition, the wires 18, 19 are provided outside the flow path in the embodiments described above, which is not limited, and the wires 18, 19 can be stacked on or under the thin film heater in the flow path. In this case, the length of the flow path in a thickness direction of the thin film heater is set to be larger than the thickness of the thin film heater and the thickness of the wires. In addition, if the wires 18, 19 are exposed outside the first substrate 11, the wires 18, 19 and the thin film heater may not extend to the end face of at least one side of the second substrate 14, and the wires 18, 19 may not necessarily be formed to overlap the thin film heater.

Still further, the cross section of the flow path of the embodiments described above which is cut in a direction perpendicular to a movement direction is semicircular or perfectly circular, which is not limited, and may be polygonal.

Further yet, the fuel cell type power generation system having the compact chemical reactor shown in the embodiments described above can be installed on electronic equipment including personal computers or mobile telephones, or image pickup devices such as digital still cameras and digital videos.

As described above, since the thin film heater is provided in the micro flow path which is provided between the substrates joined to each other, heat energy can be directly supplied into the flow path, and diffusion of the heat energy generated in the flow path can be restricted by both the substrates to significantly decrease the heat released around it, thereby making it possible to significantly decrease a loss of heat energy from the thin film heater so as to enhance the efficiency of energy use. In this way, temperature in the compact chemical reactor can be rapidly controlled owing to the small energy loss, and a chemical reaction can be easily promoted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A compact chemical reactor comprising:
    a first substrate;
    a second substrate attached to the first substrate;
    a micro flow path which is defined between the first substrate and the second substrate and which has an end opening;
    a thin film heater provided in the flow path;
    a wire connected to the thin film heater through the end opening of the flow path; and
    a sealant which seals the end opening of the flow path.

2. The compact chemical reactor according to claim 1, wherein the flow path is defined by a groove provided in the first substrate and by a surface of the second substrate opposite to the groove; and
    wherein the thin film heater is provided on the surface of the second substrate that is opposite to the groove.

3. The compact chemical reactor according to claim 1, further comprising a catalyst layer provided in the flow path.

4. The compact chemical reactor according to claim 3, wherein the flow path is defined by a groove provided in the first substrate and by a surface of the second substrate opposite to the groove;
    wherein the thin film heater is provided on the surface of the second substrate that is opposite to the groove; and
    wherein the catalyst layer is provided on a surface of the first substrate.

5. The compact chemical reactor according to claim 3, wherein the flow path is defined by a groove provided in the first substrate and by a surface of the second substrate opposite to the groove;
    wherein the thin film heater is provided in the surface of the second substrate that is opposite to the groove; and
    wherein the catalyst layer is provided on a surface of the thin film heater.

6. The compact chemical reactor according to claim 1, wherein the flow path is defined by a groove provided in the first substrate and by a surface of the second substrate opposite to the groove;
    wherein the thin film heater is provided on the surface of the second substrate that is opposite to the groove;
    wherein a first catalyst layer is provided on a surface of the thin film heater; and
    wherein a second catalyst layer is provided on a surface of the groove of the first substrate.

7. The compact chemical reactor according to claim 1, wherein the flow path is defined by a first groove provided in the first substrate and by a second groove provided in a surface of the second substrate opposite to the first groove;
    wherein the thin film heater is provided on at least one of the second groove of the second substrate and the first groove of the first substrate; and
    wherein a catalyst layer is provided on at least one of the second groove of the second substrate and the first groove of the first substrate.

8. The compact chemical reactor according to claim 1, wherein the flow path is defined by a first groove provided in the first substrate and by a second groove provided in a surface of the second substrate opposite to the first groove; and
    wherein the thin film heater is provided on at least one of the first groove of the first substrate and the second groove of the second substrate.

9. The compact chemical reactor according to claim 1, wherein a catalyst layer is provided on a surface of the thin film heater.

10. The compact chemical reactor according to claim 1, wherein the first substrate includes a material having a thermal conductivity different from a thermal conductivity of the second substrate.

11. The compact chemical reactor according to claim 1, wherein the thin film heater has an electrical resistive element which heats in response to an applied voltage.

12. The compact chemical reactor according to claim 1, wherein a third substrate is provided on a surface of the first substrate which is opposite to a surface of the first substrate that is attached to the second substrate; and
    wherein another micro flow path is provided between the first substrate and the third substrate.

13. The compact chemical reactor according to claim 12, wherein the flow path between the first substrate and the third substrate overlaps at least in part the flow path between the first substrate and the second substrate.

14. The compact chemical reactor according to claim 12, wherein a first groove is provided in a surface of the second substrate opposite to the first substrate; and
    wherein a second groove is provided in the surface of the first substrate opposite to the third substrate.

15. The compact chemical reactor according to claim 12, wherein the thin film heater is provided on the surface of the first substrate facing the second substrate.

16. The compact chemical reactor according to claim 12, wherein a catalyst layer is provided on the surface of the first substrate facing the second substrate.

17. The compact chemical reactor according to claim 1, wherein a third substrate is provided on a surface of the first substrate which is opposite to a surface of the first substrate that is attached to the second substrate;
    wherein a second micro flow path is provided between the first substrate and the third substrate; and
    wherein a combustion catalyst layer which promotes a combustion reaction of a fluid flowing in the second flow path is provided in the second flow path.

18. The compact chemical reactor according to claim 1, wherein a third substrate is provided on a second surface of the first substrate which is opposite to a first surface of the first substrate that is attached to the second substrate; and
    wherein the first substrate includes grooves respectively formed in the first surface and the second surface.

19. The compact chemical reactor according to claim 1, wherein the thin film heater generates heat to vaporize a fluid flowing in the flow path.

20. The compact chemical reactor according to claim 1, wherein a catalyst layer made of a catalyst which promotes a reaction to reform a fluid flowing in the flow path into hydrogen is provided in the flow path.

21. The compact chemical reactor according to claim 1, wherein a catalyst layer including a catalyst which promotes a reaction to produce carbon dioxide from carbon monoxide flowing in the flow path is provided in the flow path.

22. A chemical reaction system comprising:
    (a) a reaction section which includes:
        a first substrate;
        a second substrate attached to the first substrate;
        a micro flow path which is defined between the first substrate and the second substrate and which has an end opening;
        a thin film heater provided in the flow path;
        a wire connected to the thin film heater through the end opening of the flow path; and
        a sealant which seals the end opening of the flow path;
    wherein the reaction section reforms a fuel into hydrogen in the flow path; and (b) a power generation section which generates electricity using the hydrogen produced by the reaction section.

23. The chemical reaction system according to claim 22, wherein the reaction section includes a combustion section which propagates heat from fuel combustion to the reaction section.

24. A chemical reaction system comprising:
(a) a reaction section which includes:
a first substrate;
a second substrate attached to the first substrate;
a micro flow path which is defined between the first substrate and the second substrate and which has an end opening;
a thin film heater provided in the flow path;
a wire connected to the thin film heater through the end opening of the flow path; and
a sealant which seals the end opening of the flow path;
wherein the reaction section reforms a fuel into hydrogen in the flow path;
(b) a power generation section which generates electricity using the hydrogen produced by the reaction section; and
(c) a load which is activated with electrical power generated by the power generation section.

25. The chemical reaction system according to claim 24, wherein the load comprises a computer.

26. The chemical reaction system according to claim 24, wherein the load comprises a telephone.

27. The chemical reaction system according to claim 24, wherein the load comprises an image pickup device.

28. A compact chemical reactor comprising:
a first substrate;
a second substrate attached to the first substrate;
a micro flow path which is defined between the first substrate and the second substrate and which has an end opening;
a heater for heating the flow path;
a wire connected to the heater through the end opening of the flow path; and
a sealant which seals the end opening of the flow path.

29. A chemical reaction system comprising:
(a) a reaction section which includes:
a first substrate;
a second substrate attached to the first substrate;
a micro flow path which is defined between the first substrate and the second substrate and which has an end opening;
a heater for heating the flow path;
a wire connected to the heater through the end opening of the flow path; and
a sealant which seals the end opening of the flow path;
(b) a power generation section which generates electricity using hydrogen produced by the reaction section; and
(c) a load which is activated with electrical power generated by the power generation section.

30. A chemical reaction system comprising:
(a) a reaction section which includes:
a first substrate;
a second substrate attached to the first substrate;
a micro flow path which is defined between the first substrate and the second substrate;
a heater for heating the flow path; and
a wire connected to the heater; and
(b) a heat insulating wall for covering the reaction section;
wherein the wire penetrates the heat-insulating wall.

31. The chemical reaction system according to claim 30, wherein the reaction section further comprises a sealant for sealing an end of the micro flow path.

32. The chemical reaction system according to claim 30, wherein a portion of the heat insulating wall through which the wire penetrates is sealed so that a gas does not leak between an inside and an outside of the heat-insulating wall.

33. The chemical reaction system according to claim 30, wherein a pressure between the heat insulating wall and the reaction section is lower than atmospheric pressure.

34. The chemical reaction system according to claim 30, wherein a space between the heat insulating wall and the reaction section is charged with an inactive gas.

35. A chemical reaction system comprising:
(a) a reaction section which includes:
a first substrate;
a second substrate attached to the first substrate;
a micro flow path which is defined between the first substrate and the second substrate;
a heater which heats the flow path; and
a wire connected to the heater;
(b) a heat insulating wall which covers the reaction section and which is penetrated by the wire;
(c) a power generation section which generates electricity using hydrogen produced by the reaction section; and
(d) a load which is activated with electrical power generated by the power generation section.

36. The chemical reaction system according to claim 35, wherein the reaction section further comprises a sealant which seals an end of the micro flow path.

37. The chemical reaction system according to claim 35, wherein a portion of the heat insulating wall through which the wire penetrates is sealed so that a gas does not leak between an inside and an outside of the heat insulating wall.

38. The chemical reaction system according to claim 35, wherein a pressure between the heat insulating wall and the reaction section is lower than atmospheric pressure.

39. The chemical reaction system according to claim 35, wherein a space between the heat insulating wall and the reaction section is charged with an inactive gas.

* * * * *